(12) United States Patent
Yin et al.

(10) Patent No.: US 8,634,345 B2
(45) Date of Patent: Jan. 21, 2014

(54) UPLINK CONTROL INFORMATION (UCI) MULTIPLEXING ON THE PHYSICAL UPLINK SHARED CHANNEL (PUSCH)

(75) Inventors: Zhanping Yin, Vancouver, WA (US); John Michael Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 370 days.

(21) Appl. No.: 12/819,165

(22) Filed: Jun. 18, 2010

(65) Prior Publication Data

US 2011/0310855 A1   Dec. 22, 2011

(51) Int. Cl.
*H04W 4/00*   (2009.01)

(52) U.S. Cl.
USPC .......... 370/328; 370/252; 370/329; 370/336; 370/341

(58) Field of Classification Search
USPC .......... 370/252, 336, 328, 329, 341; 455/434; 714/786
See application file for complete search history.

(56) References Cited

U.S. PATENT DOCUMENTS

| | | | |
|---|---|---|---|
| 6,397,367 B1 * | 5/2002 | Park et al. ................ | 714/786 |
| 2008/0090528 A1 | 4/2008 | Malladi | |
| 2008/0253318 A1 * | 10/2008 | Malladi et al. ............. | 370/328 |
| 2009/0073922 A1 | 3/2009 | Malladi et al. | |
| 2009/0097466 A1 | 4/2009 | Lee et al. | |
| 2009/0103482 A1 * | 4/2009 | Imamura et al. ........... | 370/329 |
| 2009/0110038 A1 | 4/2009 | Montojo et al. | |
| 2009/0129259 A1 | 5/2009 | Malladi et al. | |
| 2009/0196238 A1 | 8/2009 | Cheng et al. | |
| 2009/0196366 A1 | 8/2009 | Shen et al. | |
| 2009/0201825 A1 * | 8/2009 | Shen et al. .................. | 370/252 |
| 2009/0203383 A1 | 8/2009 | Shen et al. | |
| 2009/0232070 A1 | 9/2009 | Muharemovic et al. | |
| 2009/0232101 A1 | 9/2009 | Papasakellariou et al. | |
| 2009/0296644 A1 | 12/2009 | Cheon et al. | |
| 2010/0027450 A1 | 2/2010 | Montojo et al. | |
| 2010/0039953 A1 | 2/2010 | Zhang | |
| 2010/0046460 A1 | 2/2010 | Kwak et al. | |
| 2010/0098012 A1 * | 4/2010 | Bala et al. ................ | 370/329 |

FOREIGN PATENT DOCUMENTS

| | | |
|---|---|---|
| WO | 2008/153350 | 12/2008 |
| WO | 2009/011523 | 1/2009 |
| WO | 2009/045734 | 4/2009 |
| WO | 2009/107985 | 9/2009 |
| WO | 2010/025249 | 3/2010 |

OTHER PUBLICATIONS

LG Electronics, Multiplexing scheme with UCI and data on PUSCH, Apr. 12-16, 2010, 3GPP TSG RAN WG1 #60bis R1-102387, agenda item 6.4.4, as a document for discussion and decision, pp. 1-3.*
3GPP TSG-RAN WG1#58bis, R1-094024, PUSCH COntrol Formats for CM Minimization at Cell Edge, Miyazaki, Japan, Oct. 12-16, 2009.*

(Continued)

*Primary Examiner* — Christopher Grey
(74) *Attorney, Agent, or Firm* — Austin Rapp & Hardman

(57) ABSTRACT

A method for multiplexing uplink control information (UCI) on a physical uplink shared channel (PUSCH) is described. Control data is coded with user data repetition. The coded control data is mapped to a PUSCH resource. A data block base for the coded control data is also mapped in the PUSCH resource. The UCI may include channel quality indicators (CQI)/precoding matrix indicators (PMI), acknowledgement/negative-acknowledgement (ACK/NACK) and rank indicators (RI).

58 Claims, 19 Drawing Sheets

(56) References Cited

OTHER PUBLICATIONS

Qualcomm Incorporated, "UCI Multiplexing for SU-MIMO Transmission," 3GPP TSG-RAN WG1 #61, R1-102762, May 2010.
Motorola, "UCI Multiplexing on PUSCH in UL-MIMO Transmissions," 3GPP TSG RAN1 #61, R1-103180, May 2010.
International Search Report issued for International Patent Application No. PCT/JP2011/064332 on Sep. 13, 2011.
ZTE, "UCI Multiplexxing on PUSCH with MIMO Transmission," R1-101818, Apr. 2010.
Nokia Siemens Networks, "UCI Transmission on PUSCH with SU-MIMO," R1-101905, Apr. 2010.
Huawei, "Analysis of Multiplexing Schemes of Control and Data in Multi-layer PUSCH Transmission," R1-101967, Apr. 2010.
Texas Instruments, "Data and Control Multiplexing for UL multi-Antenna Transmission," R1-102108, Apr. 2010.
Motorola, "UL 4-Tx Rank-2 Codebook," R1-102143, Apr. 2010.
Motorola, "On Multiplexing Control and Data in Multi-layer UL-MIMO Transmissions," R1-102149, Apr. 2010.
Samsung, "Discussion on Data and Control Multiplexing in UL MIMO Transmissions," R1-102212, Apr. 2010.
ETRI, "UCI Multiplexing with Data on PUSCH," R1-102247, Apr. 2010.
LG Electronics, "Multiplexing Scheme with UCI and Data on PUSCH," R1-102387, Apr. 2010.
Huawei et al., "Way Forward for UCI Multiplexing in PUSCH with Multi-Layers," R1-102554, Apr. 2010.
3GPP TS 36.212 V9.0.0, "Evolved Universal Terrestrial Radio Access (E-UTRA); Multiplexing and Channel Coding (Release 9)," Dec. 2009.
MCC Support, "Final Report of 3GPP TSG RAN1 WG1 #60bis v1.0.0," R1-102601, May 2010.

* cited by examiner

UPLINK CONTROL INFORMATION (UCI) MULTIPLEXING ON THE PHYSICAL UPLINK SHARED CHANNEL (PUSCH)

TECHNICAL FIELD

The present invention relates generally to wireless communications and wireless communications-related technology. More specifically, the present invention relates to systems and methods for uplink control information (UCI) multiplexing on the physical uplink shared channel (PUSCH).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

A wireless communication device may communicate with one or more base stations via transmissions on the uplink and the downlink. The uplink (or reverse link) refers to the communication link from the wireless communication device to the base station, and the downlink (or forward link) refers to the communication link from the base station to the wireless communication device. A wireless communication system may simultaneously support communication for multiple mobile stations.

Various signal processing techniques may be used in wireless communication systems to improve efficiency and quality of wireless communication. One such technique may include encoding and decoding where a transmitting device may encode data before transmission and a receiving device may decode the received data. Therefore, benefits may be realized by improved coding techniques.

DETAILED DESCRIPTION

Figure 1:
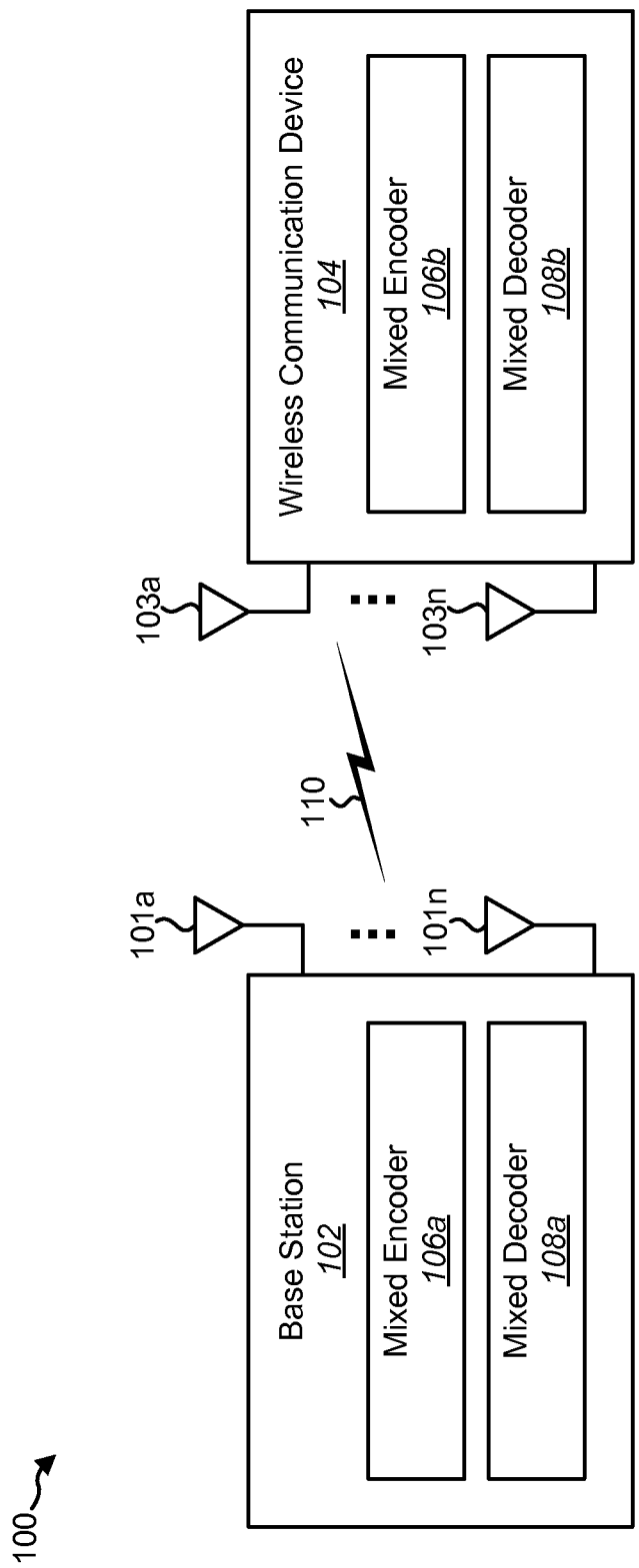
FIG. 1 is a block diagram illustrating a wireless communication system using mixed encoding and mixed decoding.

A method for multiplexing uplink control information (UCI) on a physical uplink shared channel (PUSCH) is described. Control data is coded with user data repetition. The coded control data is mapped to a PUSCH resource. A data block base for the coded control data is mapped in the PUSCH resource.

The PUSCH resource may include a slot. The control data may include channel quality indicators (CQI)/precoding matrix indicators (PMI), acknowledgement/negative-acknowledgement (ACK/NACK) and rank indicators (RI). Mixed coded CQI/PMI may be multiplexed from the top down of the slot. A first data block may be used as a superposition coding base for the mixed coded CQI/PMI. Mixed coded ACK/NACK may be channel interleaved from the bottom up in a required column of the slot. A second data block may be used as a superposition coding base for the mixed coded ACK/NACK. Mixed coded RI may be channel interleaved from the bottom up in a required column of the slot. A third data block may be used as a superposition coding base for the mixed coded RI.

A mixed CQI/PMI control output may be obtained as an XOR output of the first data block and an expanded CQI/PMI control coding output. A mixed ACK/NACK control output may be obtained as an XOR output of the second data block and expanded ACK/NACK coding outputs. A mixed RI control output may be obtained as an XOR output of the third data block and expanded RI coding outputs.

A rate matched data output may have a coding rate greater than 1/3. The first data block may be on subcarriers that are immediately below a control multiplexing region as the superposition coding base. A rate matched data output may have a coding rate less than 1/3. The first data block may be on subcarriers that are immediately below a turbo code repetition part.

The second data block may be immediately above the channel interleaved mixed coded ACK/NACK. The third data block may be immediately above the channel interleaved mixed coded RI. The slot may include a first layer and a second layer. A codeword may be mapped on both layers. The method may be performed on the first layer. The UCI may be distributed on the first layer and the second layer. The method may be performed separately for each layer.

The mixed coded CQI/PMI may be multiplexed from the top down of the first layer of the slot. The mixed coded RI may be mapped from the bottom up in the required columns of the first layer. The mixed coded ACK/NACK may be mapped from the bottom up in the required columns of the second layer. The first data block may be on subcarriers that are immediately below the multiplexed mixed coded CQI/PMI. The second data block may be on subcarriers immediately above the channel interleaved mixed coded ACK/NACK. The third data block may be immediately above the channel interleaved mixed coded RI.

The first data block may be on subcarriers of the second layer corresponding to the multiplexed mixed coded CQI/PMI. The second data block may be on subcarriers of the second layer corresponding to the multiplexed mixed coded ACK/NACK. The third data block may be on subcarriers of the second layer corresponding to the multiplexed mixed coded RI.

A first codeword may be mapped to the first layer and a second codeword may be mapped to the second layer. The method may be performed on the first layer. The UCI may be distributed on the first layer and the second layer. The method may be performed separately for each layer.

The mixed coded CQI/PMI may be multiplexed from the top down of the first layer of the slot. The mixed coded RI may be mapped from the bottom up in the required columns of the first layer. The mixed coded ACK/NACK may be mapped from the bottom up in the required columns of the second layer.

The first data block may be on subcarriers that are immediately below the multiplexed mixed coded CQI/PMI. The second data block may be on subcarriers immediately above the channel interleaved mixed coded ACK/NACK. The third data block may be immediately above the channel interleaved mixed coded RI. The second data block may be on subcarriers of the second layer corresponding to the multiplexed mixed coded ACK/NACK. The third data block may be on subcarriers of the second layer corresponding to the multiplexed mixed coded RI.

The slot may include a first layer, a second layer, a third layer and a fourth layer. A first codeword may be mapped to the first layer and the second layer. A second codeword may be mapped to the third layer and the fourth layer. The method may be performed on the first layer. The mixed coded CQI/PMI may be distributed and multiplexed on the first layer and the second layer. The mixed coded ACK/NACK and the mixed coded RI may be distributed and mapped on the first layer, the second layer, the third layer and the fourth layer.

A number of symbols required for mixed control coding may be computed based on $k*\beta$-offset. The control data may include channel quality indicators/precoding matrix indicators (PMI). Mixed coded may be mapped CQI/PMI from the top down of a first layer of a slot. The slot may include a first layer and a second layer. A first codeword may be mapped to the first layer and a second codeword may be mapped to the second layer. A first data block may be used as a superposition coding base for the mixed coded CQI/PMI. A coded ACK/NACK may be mapped on both the first codeword and the second codeword from the bottom up in a required column. A coded RI may be mapped on both the first codeword and the second codeword from the bottom up in a required column.

Coding control data with user data repetition may include removing symbols in user data, repeating symbols in control data to increase a number of symbols in the control data, copying a number of symbols in the user data that is the same as the number of symbols in the control data, adding the copied user data symbols to the control data and multiplexing the user data and the control data. Coding control data with user data repetition may also include encoding the user data using a 1/3 Turbo code, low-density parity-check (LDPC) code, or a convolutional code. Coding control data with user data repetition may further include encoding the control data using a Reed-Muller code or a 1/3 tail biting convolutional code.

The repeating may include copying symbols in the control data $k*m$ times, where k is a constant determined based on the type and size of the control data, a resource allocation offset, $\beta$-offset, sent from a base station, and a modulation and coding scheme (MCS), and m is a repetition scalar determined based on the resource allocation offset, $\beta$-offset. The control data and user data may be transmitted on a physical uplink shared channel (PUSCH) in a long term evolution (LTE) system. The adding may include a bitwise exclusive or (XOR) operation. The control data may be a channel quality indicator (CQI), acknowledgment/non-acknowledgment data (ACK/NACK), or a rank indicator (RI). The multiplexing may include time division multiplexing (TDM) and channel multiplexing.

A wireless device for multiplexing uplink control information (UCI) on a physical uplink shared channel (PUSCH). The wireless device includes a processor, memory in electronic communication with the processor and instructions stored in the memory. The instructions are executable by the processor to code control data with user data repetition. The instructions are also executable by the processor to map the coded control data to a PUSCH resource. The instructions are further executable by the processor to map a data block base for the coded control data in the PUSCH resource.

FIG. 1 is a block diagram illustrating a wireless communication system 100 using mixed encoding and mixed decoding. A base station 102 may be in wireless communication with one or more wireless communication devices 104. A base station 102 may be referred to as an access point, a Node B, an eNodeB or some other terminology. Likewise, a wireless communication device 104 may be referred to as a mobile station, a subscriber station, an access terminal, a remote station, a user terminal, a terminal, a handset, a subscriber unit, user equipment, or some other terminology. The base station 102 may transmit data to the wireless communication device 104 over a radio frequency (RF) communication channel 110.

Communication between a wireless communication device 104 and a base station 102 may be accomplished using transmissions over a wireless link, including an uplink and a downlink. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas. Thus, the base station 102 may have multiple antennas 101*a-n* and the wireless communication device 104 may have multiple antennas 103*a-n*. In this way, the base station 102 and the wireless communication device 104 may each operate as either a transmitter or a receiver in a MIMO system. A MIMO system may provide improved performance if the additional dimensionalities created by the multiple transmit and receive antennas are utilized.

The base station 102 may include a mixed encoder 106*a* and a mixed decoder 108*a*. The wireless communication device 104 may also include a mixed encoder 106*b* and a mixed decoder 108*b*. The mixed encoder 106 may encode user data and control data for transmission. Specifically, the mixed encoder 106 may introduce dependency between control data and user data using a partial superposition code, in which a control data is coded over a repeated portion of user data. In one configuration, the wireless communication system 100 is an LTE system and the mixed encoder 106 reuses all existing user data and control data coding schemes in LTE release 8 with one binary adding step at the encoding. Different feedback levels may be used to get different levels of performance enhancement.

The mixed decoder 108 may decode a received signal and produce user data and control data. For fast control decoding, the repeated portion of the data message may be selected so that the decoding of the control data achieves at least the same performance as in time division multiplexing (TDM). Due to the differential decoding nature of the repeated user data cancellation used by the mixed decoder 108, the user data portion that is mapped and added to the control message may be approximately twice that of the control message in TDM version. Thus, some puncturing may be performed on the user data to give enough space. This may cause some loss on the user data performance. However, after successful decoding of the control message, the repeated user data block may be recovered by canceling the control coding at the superposition portion. The repetition of the user data block may improve the performance on the data decoding. Therefore, the coding gain from the repetition may be higher than the loss from the extra puncturing, thus overall gain may be achieved on user data in addition to control data. Furthermore, with the feedback from user data, the control performance may be further enhanced. By adjusting the mapped portion, better performance may be observed on both user data and control data compared with release 8 of TDM.

Thus, the present systems and methods utilize the better error protection on control data to give positive feedback on user data and less error output of a user data decoder to give positive feedback on control data. The performance of the system 100 may be greatly enhanced by the introduced mutual information. Furthermore, the present systems and methods are not limited to one control message, i.e., multiple control messages with different β-offsets may be used in the same manner.

Therefore, the present systems and methods include a coding method to joint code two different messages with unequal error protection (UEP) requirements, a decoding process with different levels of feedback and performance enhancement and a partial unequal error protection (UEP) implementation for different user data/control data ratios.

Figure 2:
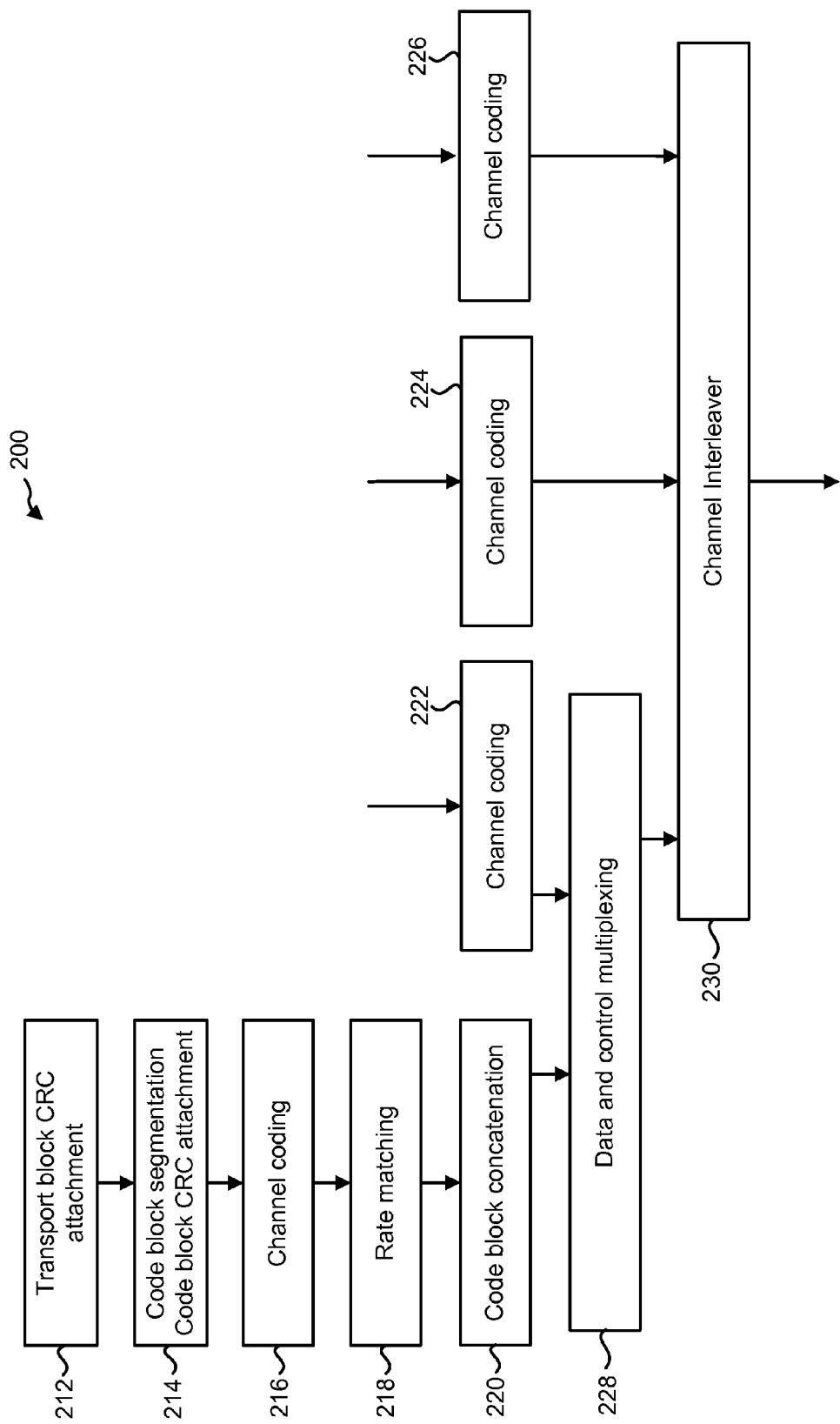
FIG. 2 is a flow diagram illustrating a method for coding and multiplexing user data with control data.

FIG. 2 is a flow diagram illustrating a method 200 for coding and multiplexing user data with control data. The method 200 may be performed by a base station 102 or a wireless communication device 104. User data may arrive to a coding unit at a rate of one transport block every transmission time interval (TTI). Parity bits for a Cyclic Redundancy Check (CRC) may be computed and attached 212 to a transport block. The bits in the transport block may be segmented 214 into one or more code blocks. If the number of bits in the transport block is more than a max code block size, (e.g., 6144), multiple code blocks may be used. If more than one code blocks are used, a CRC sequence may be attached to each code block. However, if the number of bits in the transport block is fewer than a max code block size, only one code block may be used.

Each code block may then be turbo encoded 216. The turbo coded blocks may then be rate matched 218. Rate matching may include puncturing/removing, or expanding/repeating bits from the turbo coded blocks. The rate matched code blocks may then be concatenated 220 together. In addition to user data, various control data may also be coded 222, 224, 226, e.g., channel quality indicators (CQI), precoding matrix indicators (PMI), acknowledgment/non-acknowledgment data (HARQ-ACK), rank indication (RI), etc. Some of the coded control data may be multiplexed 228 with the user data. Furthermore, the multiplexed signal may be interleaved 230 with coded control data, i.e., modulation symbols are mapped onto the transmit waveform.

In LTE Release-8, the control and data multiplexing is performed such that hybrid automatic repeat request acknowledgement (HARQ-ACK) information is present on both slots and is mapped to resources around the demodulation reference signals. In addition, the multiplexing ensures that control and data information are mapped to different modulation symbols. The control mapping is performed in two different ways depending the type of control information (data and control multiplexing or using a channel interleaver).

The data and control multiplexing 228 may multiplex coded control information for CQI/PMI. The inputs to the data and control multiplexing 228 are the coded bits of the control information and may be denoted by $q_0, q_1, q_2, q_3, \ldots, q_{Q_{CQI}-1}$ and the coded bits of the UL-SCH may be denoted by $f_0, f_1, f_2, f_3, \ldots, f_{G-1}$. The output of the data and control multiplexing operation may be denoted by $g_0, g_1, g_2, g_3 \ldots, g_{H'-1}$, where $H=(G+Q_{CQI})$ is the total number of bits on UL-SCH and $H'=H/Q_m$ is the total number of symbols with modulation order of $Q_m$ (e.g., $Q_m=2$ for QPSK, $Q_m=6$ for 16QAM and where $\underline{g}_i$, $i=H'-1$ are column vectors of length $Q_m$). H is the total number of coded bits allocated for UL-SCH data and CQI/PMI information. In other words, the coded CQI is allocated to the REs at the top of the PUSCH resource in a top to down manner.

The channel interleaver 230 in conjunction with the resource element mapping for PUSCH implements a time-first mapping of modulation symbols onto the transmit waveform while ensuring that the HARQ-ACK information is present on both slots in the subframe and is mapped to resources around the uplink demodulation reference signals. Similar method is used for rank indicator (RI) information with different mapping locations.

Figure 3:
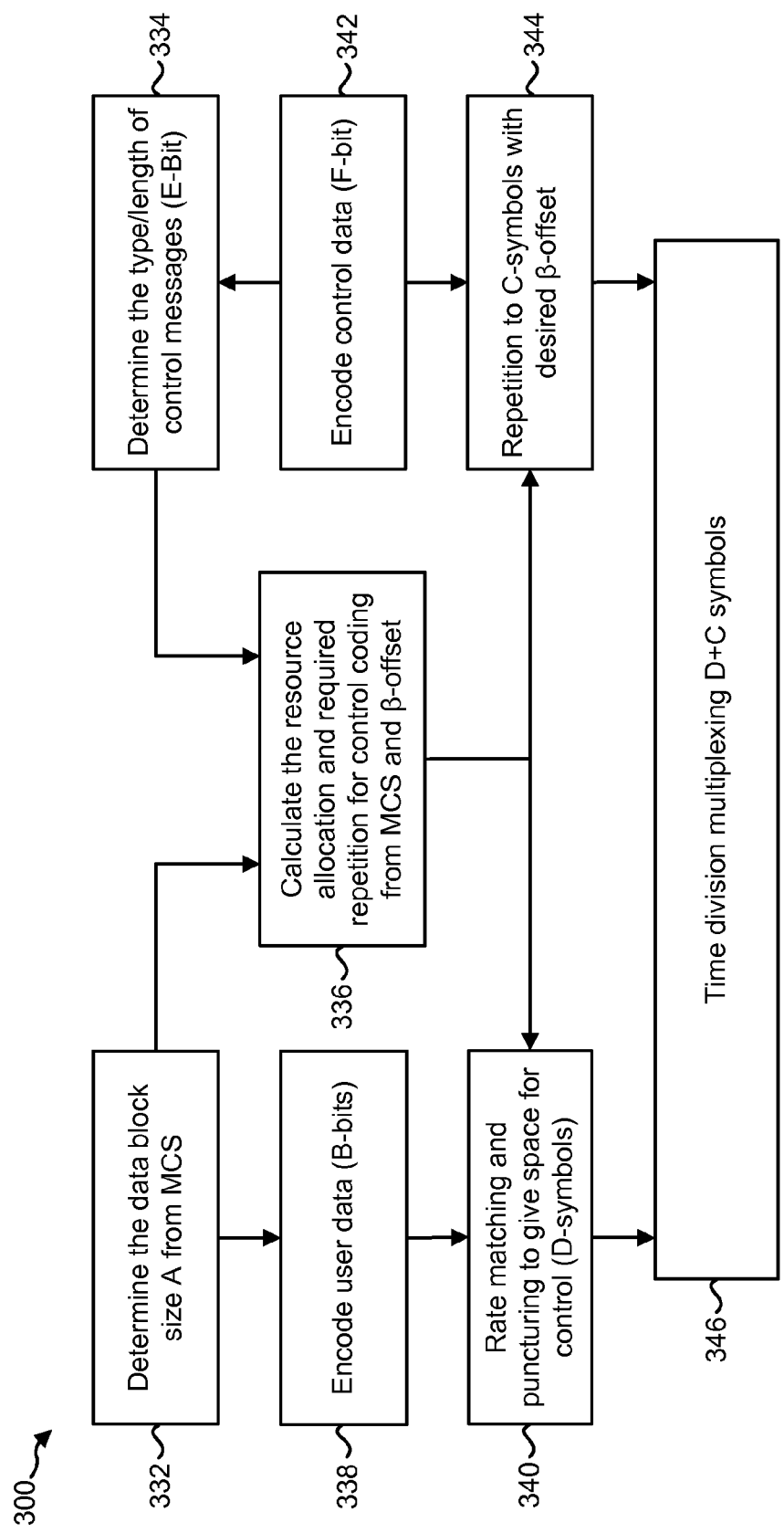
FIG. 3 is a flow diagram illustrating a method for encoding and multiplexing user data and control data.

FIG. 3 is a flow diagram illustrating a method 300 for encoding and multiplexing user data and control data. The method 300 may be performed by an encoder on a base station 102 or a wireless communication device 104. The encoder may determine 332 the user data block size, A, and the modulation order $Q_m$ from the current modulation and coding scheme (MCS). The MCS may be provided by a base station 102. The encoder may also determine 334 the type and length of control data, i.e., control messages. The uncoded control data may be E bits. The encoder may also calculate 336 the resource allocation and repetition scalar, m, for control data coding from the MCS setting and resource allocation offset β-offset. The resource allocation offset, β-offset, may be received from a base station 102 and may determine the resource allocation between user data and control data. The repetition scalar, m, may be determined based on the MCS setting and the resource allocation offset, β-offset, and may determine the number of times the control data is repeated.

The encoder may also encode 338 the user data to produce B bits of encoded data. In one configuration, the user data and control data may be coded separately using different coding techniques. The user data may be coded with a rate 1/3 Turbo code. The encoder may also rate match 340 based on the allocated PUSCH resource, and then puncture the user data to give space for control data. This may produce D symbols of rate matched turbo coded data.

The encoder may also encode 342 the control data into F bits. This may include using a Reed-Muller code, 1/3 tail biting convolutional code, etc. The encoder may also repeat 344 the F bits of coded control data m times to produce C symbols with modulation order of $Q_m$. The parameter m may be calculated based on the resource allocation offset, β-offset, that is received from a base station. The encoder may also combine 346 the coded rate matched user data with the coded extended control data using time division multiplexing (TDM) H'=(D+C) symbols, where H' is the number of symbols for the allocated PUSCH resource. The H' symbols are mapped on the PUSCH resource and are transmitted in one uplink frame. Both the coded data and coded control are rate matched and/or repeated to integer number of symbols.

Figure 4:
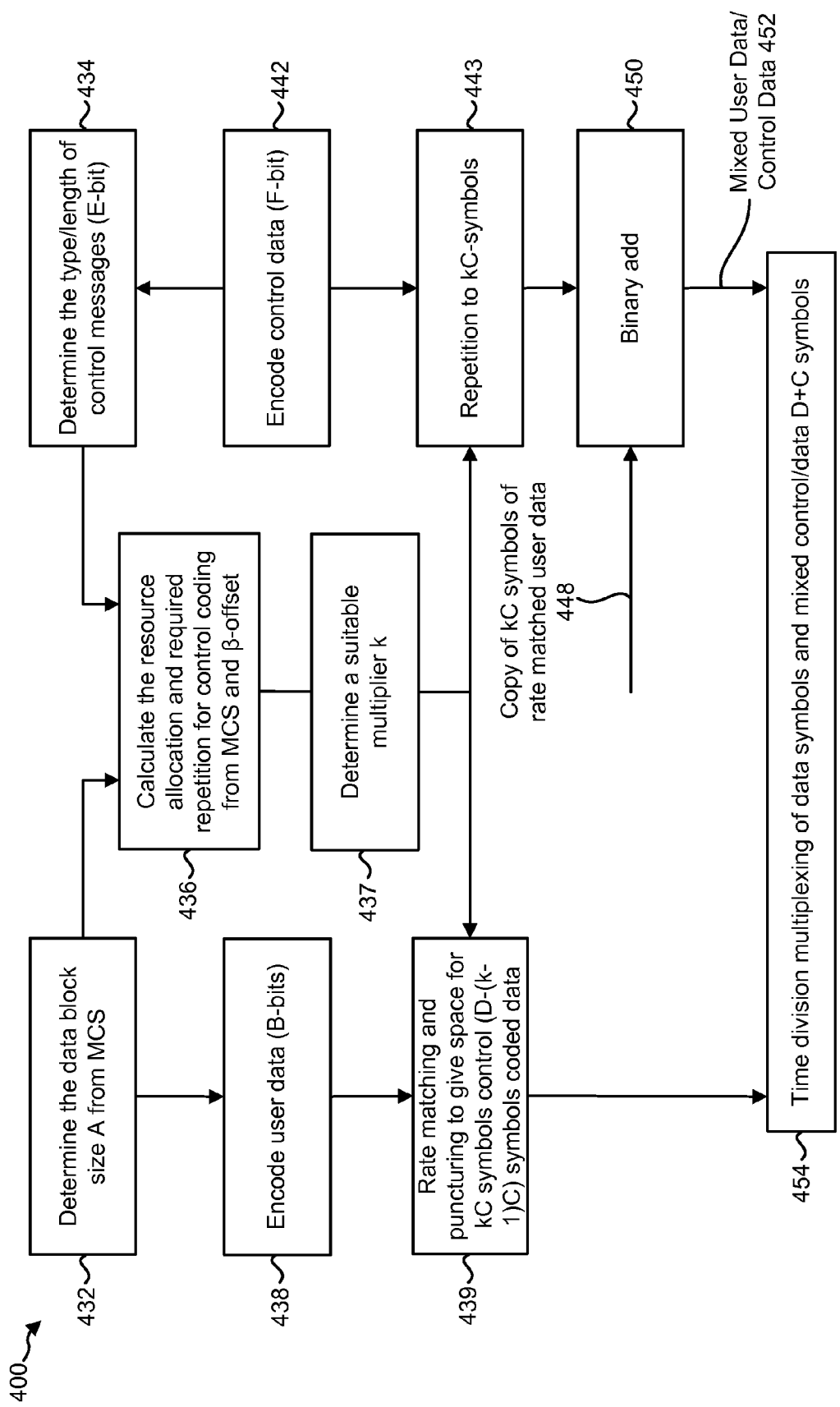
FIG. 4 is a flow diagram illustrating a method for mixed encoding.

FIG. 4 is a flow diagram illustrating a method 400 for mixed encoding. The method 400 may be performed by a mixed encoder 106 on a base station 102 or a wireless communication device 104. Similar to the method 300 illustrated in FIG. 3, the mixed encoder 106 may determine 432 the user data block size, A, from the current modulation and coding scheme (MCS). The MCS may be provided by a base station 102. The mixed encoder 106 may also determine 434 the type and length of control data, i.e., control messages. The uncoded control data may be E bits. The mixed encoder 106 may also calculate 436 the repetition scalar, m, for control data coding based on the MCS setting and the resource allocation offset β-offset. The resource allocation offset, β-offset, may be received from a base station 102 and may determine the resource allocation between user data and control data. The repetition scalar, m, may be determined based on the MCS setting and the resource allocation offset, β-offset, and may determine the number of times control data is repeated. The mixed encoder 106 may also determine 437 a mixing scalar, k, which may also be used to determine the number of times control data is repeated. The mixing scalar, k, may be determined 437 based on a pre-defined algorithm from known parameters, e.g., MCS setting, type/size of control information, β-offset, etc. Alternatively, the mixing scalar, k, may be determined 437 from a lookup table of different input parameter combinations. The lookup table may be pre-defined and may be changed by mutual agreement between a base station 102 and a wireless communication device 104.

The mixed encoder 106 may also encode 438 the user data to produce B bits of encoded data. Likewise, the mixed encoder 106 may also encode 442 the control data into F bits. As before, the user data and control data may be coded separately using different coding techniques. The user data may be coded with a rate 1/3 Turbo code and the control data may be coded with a Reed-Muller code or 1/3 tail biting convolutional code.

The encoder may also rate match 439 the user data and give space for control data. In this method 400, however, the control data may be kC symbols, where k is a mixing scalar. Therefore, the rate matching 439 may reduce the D symbols of user data to (D−(k−1)C) symbols of modulation order $Q_m$ to accommodate the kC symbols of control data with the same modulation order $Q_m$. In other words, the control data is larger in the method 400 illustrated in FIG. 4 than in the method 300 illustrated in FIG. 3. Therefore, the rate matching in the method 400 illustrated in FIG. 4 may reduce the user data more than in the method 300 illustrated in FIG. 3 to accommodate the larger control data.

The mixing encoder 106 may also repeat 443 the F bits of coded control data k*m times to produce kC symbols. In other words, the method 400 illustrated in FIG. 4 repeats the coded control data k times more than the method 300 illustrated in FIG. 3, thus resulting in kC symbols rather than C symbols.

Rather than combining the coded rate matched user data and the coded extended control data, the mixing encoder 106 may binary add 450 (i.e., binary XOR operation) a copy of kC symbols of the rate matched user data 448 with the coded control data. This may produce mixed user data/control data 452. The XOR operation is between $Q_m$*kC bits of the copy of kC symbols of the rate matched data and the $Q_m$*kC bits of the kC symbols of coded control. The output $Q_m$*kC bits is grouped back into kC symbols with modulation order of $Q_m$. The mixing encoder 106 may then combine 454 the coded rate matched user data with the mixed user data/control data block 452 (H'=D+C symbols) using time division multiplexing (TDM) so that the total number of symbols on the UL-SCH is still H'.

Figure 5:
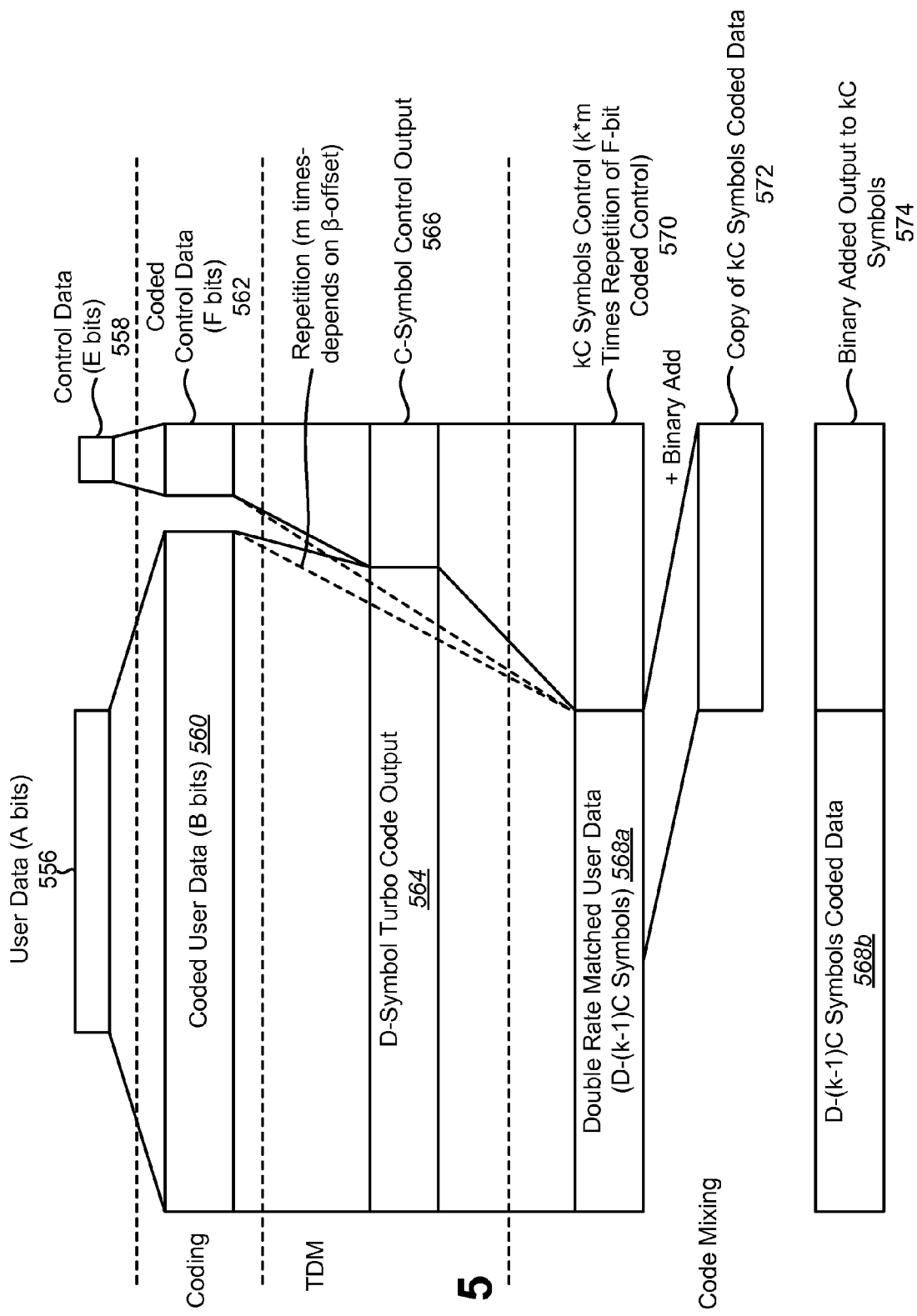
FIG. 5 is a block diagram illustrating time division multiplexing (TDM) and mixed encoding.

FIG. 5 is a block diagram illustrating time division multiplexing (TDM) and mixed encoding. In communication systems, it is very common that different messages have different target error protection requirements, i.e. they require unequal error protection (UEP). A more important message may be much shorter than the other messages, such as user data, but may require more robust error protection. For example, control data 558 such as a channel quality indicator (CQI) and acknowledgment/non-acknowledgment data (ACK/NACK) may require more error protection than user data 556.

One possible method to achieve UEP is to code the different messages separately and transmit in different time/frequency resource allocations. Specifically, UEP may be achieved by different code redundancy, such as coding rate, the number of repetitions, etc. For example, user data 556 and control data 558 on the long term evolution (LTE) physical uplink shared channel (PUSCH) are coded and transmitted separately using TDM. A resource allocation offset, β-offset, is defined to give better protection on the control data, so that β times resource is allocated to each control data bit compared with each user data information bit.

The control redundancy (e.g., on LTE PUSCH) is provided by a simple repetition of the coded control data 562 bits. The number of repetitions may be denoted by a repetition scalar, m, that is calculated by the corresponding modulation and coding scheme (MCS) setting and the resource allocation offset, β-offset. The coded user data 560 is rate matched to provide resources for the control allocation. The default resource allocation offset, β-offset, may be 20 times for ACK/NACK and rank indicator (RI), and 6.25 times for CQI. Although only one type of control message is illustrated in FIG. 5, the same technique applies to multiple control messages with different β-offsets.

The MCS setting provided by a base station 102 defines the total number of resource elements (REs) available for a subframe transmission, and the user data 556 transport block size A. The wireless communication device 104 (e.g., user equipment) may have the types/lengths of control messages to be transmitted in the current subframe, e.g. E bits of control data 558.

The user data 556 and control data 558 may be coded separately with the specified coding methods to B and F bits, respectively. For example, in LTE, user data 556 may be coded with rate 1/3 Turbo code to produce coded user data (B bits) 560. In contrast, the control data 558 may use a different code, e.g., the CQI may be coded by a (32, O) Reed-Muller code when the length of the CQI is 11 bits or less, while the CQI may be coded by a 1/3 tail biting convolutional code when the length of the CQI is more than 11 bits. This may produce coded control data (F bits) 562.

The coded user data 560 and coded control data 562 may be adjusted and multiplexed with required control redundancy. Specifically, the coded user data 560 may be rate matched to fit into the resource elements (REs) of the current MCS setting. This may include puncturing bits in the coded user data 560 to give space for the control messages. The coded control data (F bits) 562 may be repeated m times to C bits, where m is a repetition scalar calculated based on the resource allocation offset, β-offset.

The D-symbol turbo code output 564 may then be combined with the extended control data (C symbols) 566 using TDM. However, this may not provide any interaction between the rate matched user data 564 and the extended control data 566.

The present systems and methods, however, include a code mixing mechanism to provide deterministic dependency between messages. Specifically, the present systems and methods mix coded control data with a block of repeated user data. Thus, an iterative feedback may be added to one message after the decoding of the other as follows. Furthermore, mixed coding explores the marginal distribution of two sets of codes, and may significantly improve the overall system performance.

In one configuration, mixed coding is implemented in LTE with minimum modifications on existing LTE schemes. The code may reuse the existing channel coder with a simple extra step at encoder. At the decoder, the outputs of the decoders may feedback to each other and reinforce the code performance. Three different feedback levels may be defined for decoding to get different levels of performance enhancement with different complexity. Level 1 is to feedback coded control only. Level 2 is to feedback decoded control, thus control coding gain is utilized. Level 3 is to feedback decoded data output, thus the data coding gain is also explored. Analytical and simulation results show that mixed coding may increase performance compared with the standard time division multiplexing (TDM) scheme in LTE on physical uplink share channel (PUSCH).

For low rate settings where the user data coding rate is less than 1/3, better performance is achieved on user data and control data simultaneously. The user data performance is similar to that of user data only if no control data is added, thus better than the data performance in TDM. The control data may spread into a larger portion, and thus may be more reliable than control data in TDM version with 3 dB, 6 dB or even more coding gains depending on the spreading factor. This may be a particularly optimal use case for mixed coding.

For medium and high rate settings, the mixed coding may provide comparable performance even without Level 3 feedback and better overall performance with Level 3 feedback. With the same user data performance as in TDM, a gain of 1.5 dB to 3 dB may be observed on control data. On the other hand, if the same control data performance is maintained, it may bring some performance gain over TDM.

Code mixing may utilize the user data and control data coding with an extra step of determined code block repetition and mixing. With a scale factor of k, the rate matched user data 564 may be rate matched again to produce double rate matched user data (D−(k−1)C symbols coded data) 568a. The extended control data 566 may be extended again using repetition to produce double extended control data (kC symbols) 570. Alternatively, the double rate matched user data 568a may be produced by rate matching the coded user data (B bits) 560 directly using a resource allocation offset of β-offset=k* (given β-offset). Likewise, the double extended control data 570 may be produced by repeating the coded control data 562 directly using a repetition scalar m=k*m. The appropriate value of k may be decided by the operating channel condition. For example, k may be chosen as 2 or greater to give fast control decoding with comparable performance, or chosen between 1 and 2 if level 3 feedback is used.

A copy of kC symbols of the double rate matched user data 572 may be taken from the double rate matched user data 568a and binary added with the extended control data (kC symbols) 570. This may produce mixed user data/control data 574 that may be included in the final output along with the double rate matched user data 568b. Mathematically, the binary add may use a bitwise XOR operation.

Alternatively, if the coding rate used for the user data 556 is less than 1/3, a repetition block may already be present in the rate matcher. Therefore, the repetition block in the rate matcher may be used instead of implementing a second rate matcher.

Additionally, the determination of the mixing scalar, k, may be based on a pre-defined algorithm from other parameters, such as MCS setting, type/size of control information, resource allocation offset (β-offset), etc. The appropriate value may be evaluated by offline optimization functions for different data/control multiplexing settings. In implementation, the mixing scalar k may be a simple lookup table of different input parameter combinations. The table may be pre-defined. It may also be possible to make customized changes by mutual agreement between a base station 102 and a wireless communication device 104, e.g., an eNodeB and user equipment. Furthermore, the number of repetitions m in the user data and control data multiplexing, and the mixing scalar k may be non-integer numbers, i.e., m and k may also be fractional values.

Figure 6:
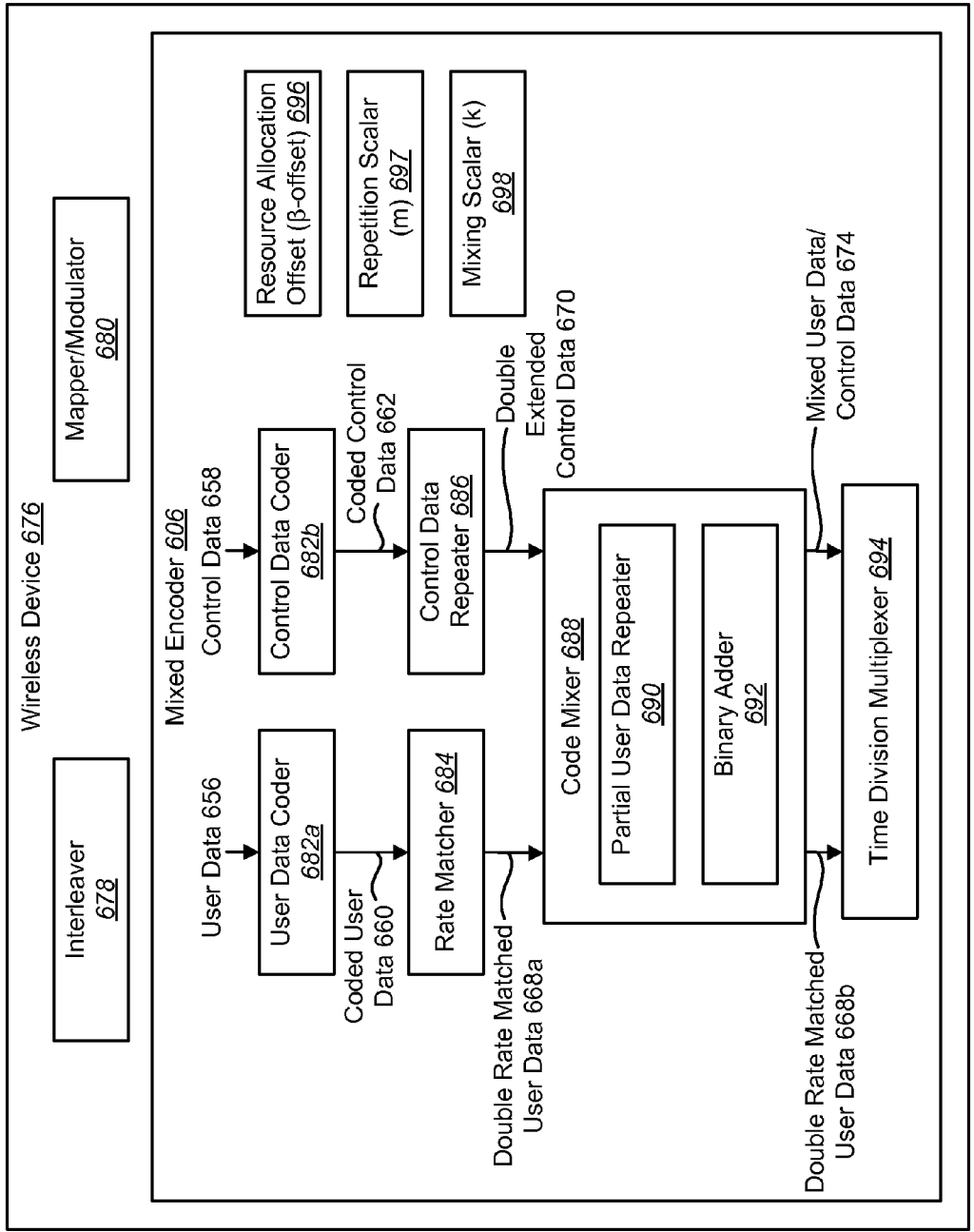
FIG. 6 is a block diagram illustrating a wireless device that uses mixed coding.

FIG. 6 is a block diagram illustrating a wireless device 676 that uses mixed coding. The wireless device 676 may be a base station 102 or a wireless communication device 104. A mixed encoder 606 may receive a data stream that includes user data 656 and control data 658. A user data coder 682a may encode the user data 656 to produce coded user data 660, e.g., using a 1/3 Turbo decoder. A control data coder 682b may encode the control data 658 to produce coded control data 662, e.g., using a Reed-Muller code or a 1/3 tail biting convolutional code. The coded user data 660 may be rate matched in a rate matcher 684 to produce double rate matched user data 668a. The coded control data 662 may be extended in a control data repeater 686 to produce double extended control data 670. This may include repeating the coded control data 662 a number of times indicated by the repetition scalar 697, m, and a mixing scalar 698, k (i.e., the bits in the coded control data 662 may be repeated k*m times to produce the double extended control data 670). The repetition scalar 697 may be determined by a resource allocation offset 696, β-offset, received from a base station 102. The mixing scalar k 698 may be determined based on a pre-defined algorithm from other parameters, such as MCS setting, type/size of control information, resource allocation offset 696, β-offset, etc.

Alternatively, the rate matching of the coded user data 660 may include an intermediate step, not shown, where the coded user data 660 is rate matched into rate matched user data 564 that is then rate matched again into double rate matched data 668a. Similarly, the extending of the coded control data 662 into double extended control data 670 may include an intermediate step, not shown, where the coded control data 662 is extended into extended control data 566 that is then extended again into double extended control data 670. If the intermediate step is used, the extended control data 566 may include C symbols (i.e., $Q_m$*C bits) while the double extended control data 670 may include $Q_m$*kC bits (i.e., kC symbols with modulation order of $Q_m$). Thus, the double extended control data 670 may include k multiples of the number of bits included in the extended control data 566.

A code mixer 688 may copy a portion ($Q_m$*kC bits) of the double rate matched user data 668a using a partial user data repeater 690. The copy of $Q_m$*kC bits of double rate matched user data 572 may be added to the double extended control data 670 to produce mixed user data/control data 674. The binary adding may be performed by a binary adder 692. The double rate matched user data 668b and the mixed user data/control data 674 may be combined in a time division multiplexer 694. After encoding, the combined output of the mixed encoder may be interleaved and mapped or modulated by an interleaver 678 and a mapper/modulator 680.

Figure 7:
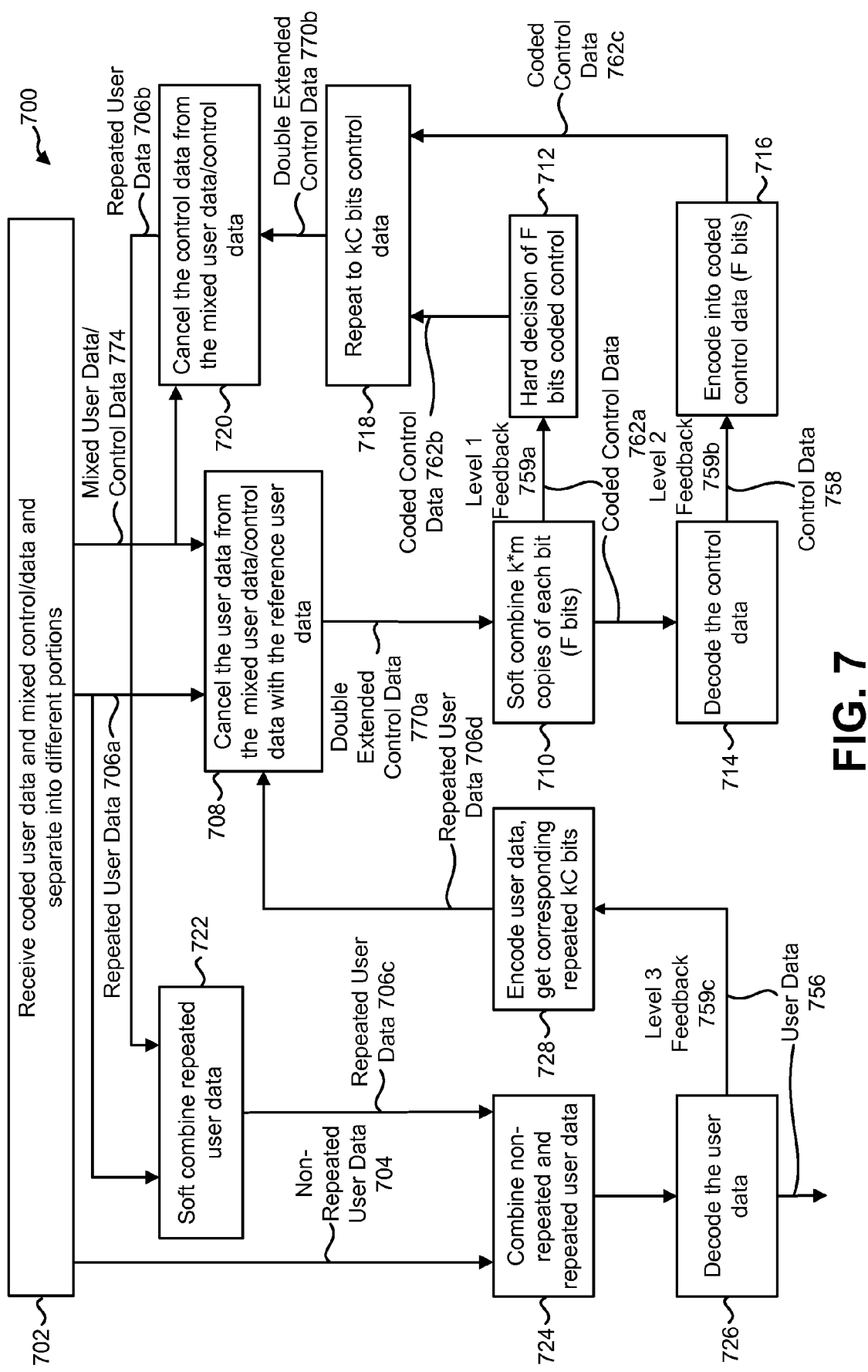
FIG. 7 is a flow diagram illustrating a method for mixed decoding.

FIG. 7 is a flow diagram illustrating a method 700 for mixed decoding. The method 700 may be performed by a mixed decoder 108 on a base station 102 or a wireless communication device 104. Data described in the mixed decoder 108 as corresponding to data in a mixed encoder 106 may be estimates of such data, and therefore, may include differences. Additionally, data described in the mixed decoder 108 may be in soft form (e.g., log likelihood ratios (LLRs)) or hard form (i.e., a form that includes no indication of probability or reliability of the data).

With a determined user data code repetition, the "dirty paper" of the control message may be known. Therefore, at the receiver, the dirty channel may be cancelled first from the mixed user data/control data to get the coded control data. Then the coded control data may be cancelled to get another copy of the repeated user data. The soft combining of two copies of the repeated user data may provide better received signal quality, thus gain on the data decoding.

Furthermore, the outputs from the control data and user data decoding may feedback to each other to give extra gain. There may be 3 possible feedback levels with different complexity. Level 1 may feedback coded control data only. Level 2 may feedback decoded control data thus control data coding gain is utilized. Level 3 may feedback decoded user data output, thus user data coding gain is also explored.

The mixed decoder 108 may receive 702 coded user data and mixed user data/control data 774. The coded user data may be separated into non-repeated user data 704 and repeated user data 706a. The non-repeated data 704 may be the portion of the received user data that was not binary added with the control data at the mixed encoder 106, i.e., the non-copied portion of the double rate matched user data 568a illustrated in FIG. 5. The repeated user data 706a may be the portion (kC bits) of the received user data that was binary added with the control data at the mixed encoder 106, i.e., the copied portion of the double rate matched user data 568a illustrated in FIG. 5. The mixed user data/control data 774 may be the binary added portion of the received data, i.e., the mixed user data/control data 574 illustrated in FIG. 5.

The mixed decoder 108 may use the repeated user data 706a as a reference and cancel 708 the user data portion of the mixed user data/control data 774 to produce double extended control data 770a. The bit log likelihood ratio (LLR) soft output may be obtained by the bit LLRs of the mixed user data/control data 774 and repeated user data 706a. This is essentially a differential decoding.

The mixed decoder 108 may then soft combine 710 k*m copies of each bit in the double extended control data 770a to produce coded control data (F bits) 762a. This may be done by simply adding the LLRs of k*m copies of the same bit.

If level 1 feedback 759a is used, the mixed decoder 108 may use the hard decision 712 to determine the hard coded control data 762b from the soft coded control data 762a. This may include converting LLRs of the soft coded control data 762a into hard, non-LLR coded control data 762b, i.e., the hard coded control data 762b may not indicate probability or reliability of data. The hard coded control data 762b may then be repeated 718 into double extended control data 770b. Alternatively, if level 2 feedback 759b is used, the coded control data 762a may be decoded 714 to produce control data 758 that may then be re-encoded 716 into coded control data 762c. The coded control data 762c may then be repeated 718 into double extended control data 770b.

The mixed decoder 108 may produce another copy of the repeated user data 706b by canceling 720 the double extended control data 770b from the mixed user data/control data 774. The soft LLR data output of the mixed block may be obtained by flipping the LLR polarity when the corresponding control data bit is 1. The mixed decoder 108 may soft combine 722 the two versions of the repeated user data 706, i.e., the received repeated user data 706a and the determined repeated user data 706b. This may give a better signal quality to a user data decoder. The combining may be a sum of the LLRs of the two versions of repeated user data 706, i.e., one from the transmission, one from the canceling 720.

The mixed decoder 108 may combine 724 and decode 726 the combined repeated user data 706c and the non-repeated user data 704 to produce user data 756. The improved input signal quality results in improved user data code performance.

Additionally, enhanced control performance may be obtained by using level 3 feedback 759c of the user data 756. If level 3 feedback 759c is used, the mixed encoder may encode 728 the user data 756 to produce corresponding repeated user data 706d. The mixed decoder 108 may then cancel 708 the repeated user data 706d from the mixed data/control data 774. This may provide a cleaner version of the double extended control data 770a. The mixed decoder 108 may then repeat the control decoding again.

An iterative process is possible to maximize the performance gain on both user data and control data. However, in most cases, one iteration may be sufficient to achieve desired performance. For fractional m and k values, the last fractional copy may be padded with all 0 values during the soft combining of LLR in the process above.

In the mixed decoding process, the control message (i.e., the control data 758) may be recovered by comparing the repeated user data 706a and the mixed user data/control data 774. This may be equivalent to transmitting the control data 758 over a noisier channel because the noises on the two blocks are added together during the decoding process. A larger k may increase the control coding redundancy and may alleviate the increased noise. After the control data 758 decoding, both level 1 feedback 759a and level 2 feedback 759b may provide cleaner coded control data 762b-c, thus improving the repeated user data 706b signal quality, then the user data performance. Level 3 feedback 759c may provide further enhancement by providing cleaner user data 756 to the mixed block, thus the control data performance may be increased.

With one or more iterations, the error residue from the user data decoding 726 and control data decoding 714 may be very small. The equivalent user data and control data performance, assuming ideal cancellation of each other, may become the performance limits. Received user data may become double rate matched user data with kC bits block repetition, and received control data may become double extended control data 770 (kC bits) with approximately 10*log 10(k) dB gain.

For low rate settings where the data coding rate is less than 1/3, mixed coding may provide better performance on user data and control data simultaneously. In this case, the control data mixing is added directly to the rate matched user data. Therefore, with control data cancellation, the user data performance is similar to that of user data only as if no control data is added, thus mixed coding may perform better than the user data in TDM. Additionally, the control data may be spread into a large portion, which may cause higher reliability than the TDM control data.

Low code rates may be used on nearly 50% of all MCS settings. Also, low code rates used more in poor channel quality, such as cell edge cases, may be vulnerable to large control data overhead. Mixed coding may be a particularly appealing solution to provide relatively large gains on both control data and user data. In fact, mixed coding may provide more gain when the control data overhead is large.

For medium and high rate settings, mixed coding may provide comparable performance even without level 3 feedback 759c and better overall performance with level 3 feedback 759c. With the same data performance as in TDM, 1.5 dB-3 dB gain may be observed on control data. On the other hand, if the same control data performance is maintained, it may bring some user data performance gain over TDM.

As an example, with a nominal 1/3 code rate user data and 3-to-1 coded user data and control data TDM allocation, coded user data may be rate matched to rate 1/2, and the whole data block may be repeated and mixed with k=2 times expanded coded control data. Mixed coding may achieve 0.6 dB performance gain on user data and 3 dB gain on control data simultaneously over the TDM version. This may be translated to 15% less transmission power to achieve the same TDM data performance with 50% less control data error than TDM version.

Figure 8:
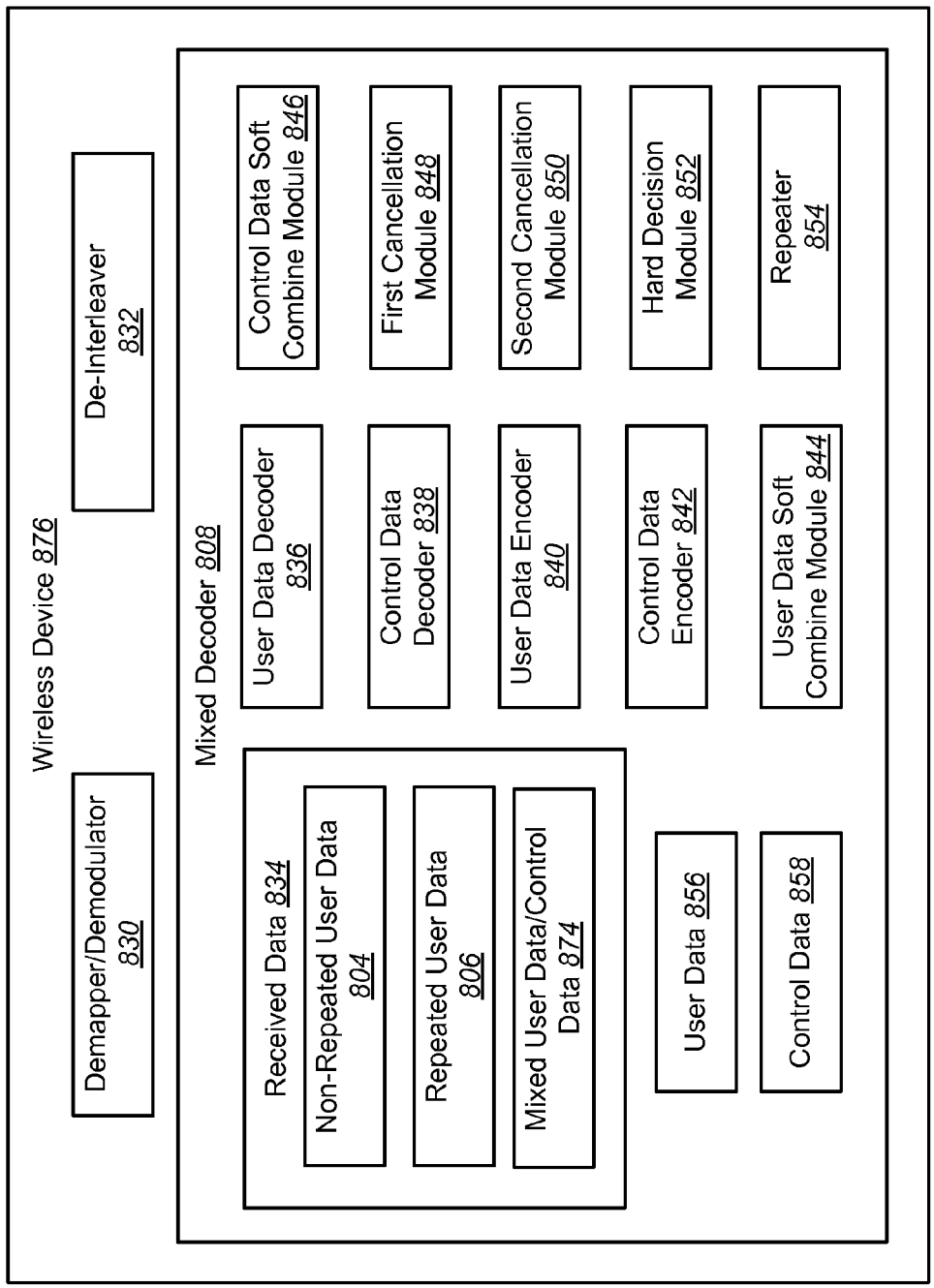
FIG. 8 is a block diagram illustrating a wireless device that uses mixed decoding.

FIG. 8 is a block diagram illustrating a wireless device 876 that uses mixed decoding. The wireless device 876 may be a base station 102 or a wireless communication device 104. A demapper/demodulator 830 and a de-interleaver 832 may demap or demodulate and de-interleave a received signal, respectively.

A mixed decoder 808 may use received data 834 to produce user data 856 and control data 858. In other words, the non-repeated user data 804, repeated user data 806, and mixed user data/control data 874 illustrated in FIG. 8 correspond to the non-repeated user data 704, repeated user data 706, and mixed user data/control data 774 illustrated in FIG. 7. To perform the decoding, the mixed decoder 808 may use a user data decoder 836 and a control data decoder 838. The user data decoder 836 may decode user data and may correspond to a user data coder 682a illustrated in FIG. 6, e.g., a 1/3 Turbo decoder. The control data decoder 838 may decode control data and may correspond to a control data coder 682b illustrated in FIG. 6, e.g., a Reed-Muller decoder or a 1/3 tail biting convolutional decoder.

The mixed decoder 808 may also include a user data encoder 840 and a control data encoder 842, a user data soft combine module 844, a control data soft combine module 846, a first cancellation module 848, a second cancellation module 850, a hard decision module 852 and a repeater 854 that are used in steps 728, 716, 722, 710, 708, 720, 712, and 718 illustrated in FIG. 7, respectively. Specifically, the user data encoder 840 may be used to produce the user data 856 and the control data encoder 842 may be used to produce the control data 858. The user data soft combine module 844 may produce repeated user data 806 and the control data soft combine module 846 may produce coded control data 762a. The first cancellation module 848 and the second cancellation module 850 may remove the repeated user data 806 and the double extended control data 770b from the mixed user data/control data 874, respectively. The hard decision module 852 may convert soft coded control data 762a into hard coded control data 762b. The repeater 854 may repeat, or extend, the bits in coded control data 762 to produce double extended control data 770b.

Figure 9:
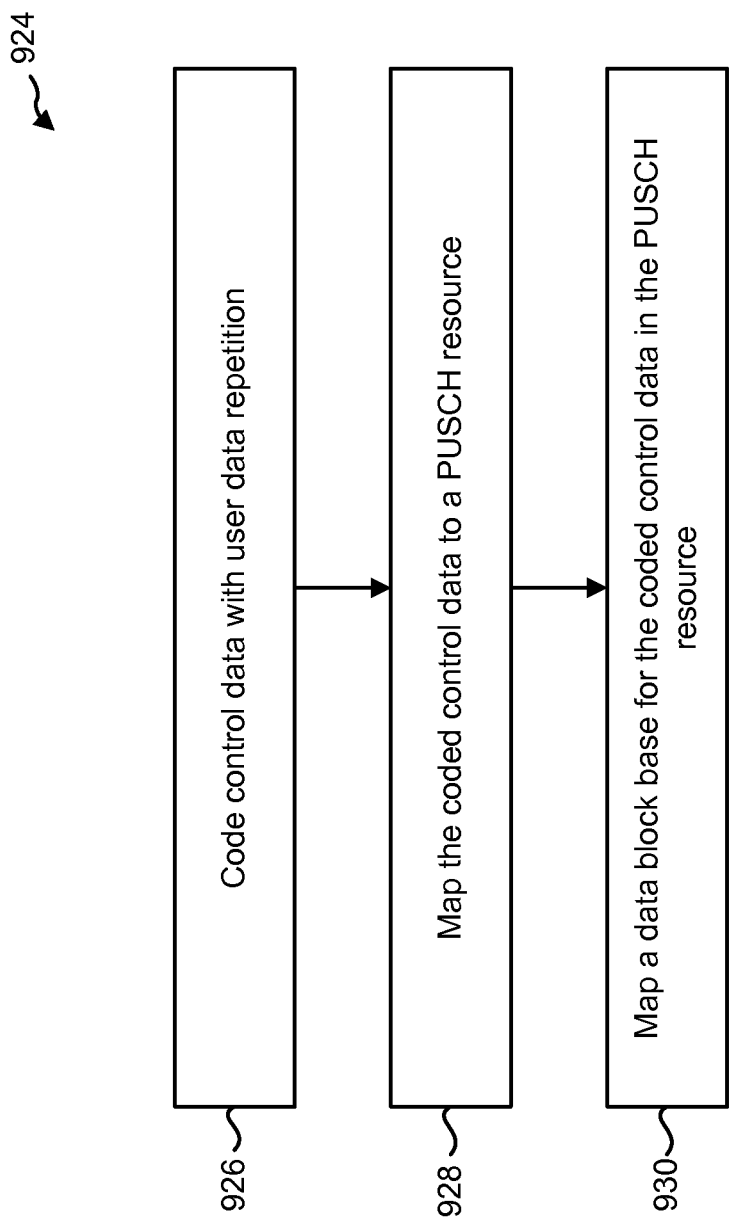
FIG. 9 is a flow diagram of a method for multiplexing uplink control information (UCI) on a physical uplink shared channel (PUSCH)

FIG. 9 is a flow diagram of a method 924 for multiplexing uplink control information (UCI) on a physical uplink shared channel (PUSCH). The method 924 may be performed by a mixed encoder 106 on a wireless device such as a base station 102 or a wireless communication device 104. The UCI may be referred to as control data. In one configuration, the UCI may include CQI/PMI, ACK/NACK and RI. The wireless device may code 926 control data with user data repetition. The wireless device may then map 928 the coded control data to the PUSCH resource. The PUSCH resource may have one or more layers. One or more codewords may be mapped to the PUSCH resources; one codeword may be mapped on one or more layers. The wireless device may also map 930 a data block base for the coded control data in the PUSCH resource. The data block base may be a superposition coding base. Mapping the data block base for the coded control data in the PUSCH resource may include identifying the location of the repeated data block that will be used as the coding base.

Figure 10:
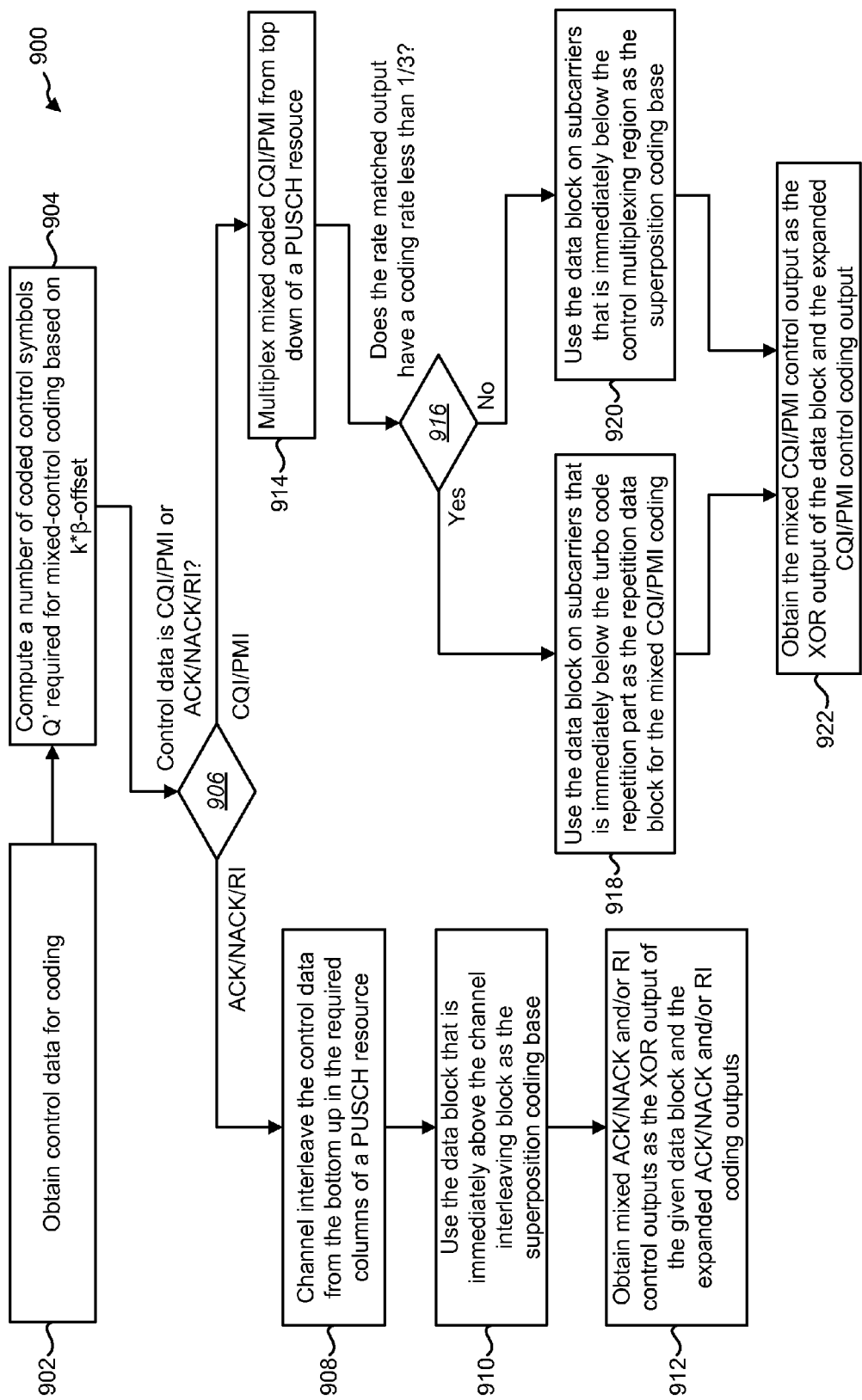
FIG. 10 is a flow diagram of a method for UCI mapping and repetition data block determination.

FIG. 10 is a flow diagram of a method 900 for UCI mapping and repetition data block determination. The method 900 may correspond to single antenna transmissions. However, the method 900 may also be modified to allow for multiple antenna transmissions (i.e., SU-MIMO). The method 900 may be performed by a wireless device. For example, the method may be performed by a mixed encoder 106 on a base station 102 or a wireless communication device 104. Compared with the standard UCI multiplexing, the mixed coding approach requires expanded control coding by the scaling factor of k. Furthermore, the repetition data block for UCI superposition coding must be determined.

Since a scale factor k is required to expand the control coding, a corresponding data block needs to be chosen as the superposition coding base. The method 900 is applicable when the new rate matched data block is larger than the expanded control block. For example, consider k=2. The code data length L_data and coded control length L_ctrl ratio with the Release-8 method should be greater than 3 so that the expanded control length L_mixedctrl=k*L_ctrl is still smaller than the puncture data block size L_data_punctured=L_data−(k−1)L_ctrl. In practice, this should be the case because the schedule should be able to correctly schedule the MCS setting and the number of physical resource blocks (PRBs) to satisfy the desired target performance.

Due to the differential nature of extracting the coded control bits from the mixed coding block and the base repetition data block, the differential coded control bit error rate will be roughly twice that of the raw channel bit error rate. Therefore, the scale factor k should also depend on the expected raw channel bit error rate. Thus, k should be higher when the expected raw channel bit error rate is high. The channel condition can be estimated by the modulation coding scheme (MCS) setting, which also decides the transport block size (TBS) index ($I_{TBS}$) used to decide the PUSCH data block size. In general, a higher MCS value represents a better channel quality.

For a single antenna transmission, only one codeword can be transmitted on one layer. The Release-9 time division multiplexing (TDM) version computes the number of symbols based on the β-offset. In the mixed control coding case, the number of symbols required for the mixed control coding depends on the k*β-offset, but the same multiplexing process as in Release-8 can be applied. Thus, the encoder 106 may obtain 902 control data for coding. The encoder 106 may then compute 904 a number of coded control symbols Q' required for mixed control coding based on k*β-offset.

The encoder 106 may determine 906 whether the control data is channel quality indicator (CQI)/precoding matrix indicator (PMI) or ACK/NACK or routing indicator (RI). If the control data is ACK/NACK or RI, the encoder 106 may channel interleave 908 the control data from the bottom up in the required columns of a slot of a PUSCH resource to minimize the probability of collision with CQI/PMI information. Channel interleaving of ACK/NACK and/or RI is to replace the data symbols on the PUSCH with the coded ACK/NACK and/or RI symbols. No rate matching on data output is needed. Instead, the data symbols may simply be replaced. In the mixed coding approach, an extra decision must be made identifying the location of the repeated data block that is used as the coding base for the mixed data/control coding. The encoder 106 may use 910 the data block that is immediately above the channel interleaving block as the superposition coding base. The encoder 106 may also obtain 912 mixed ACK/NACK and/or RI control outputs as the XOR output of the given data block and the expanded ACK/NACK and/or RI coding outputs. This mapping keeps the coding base data block in the same discrete Fourier transform-orthogonal frequency division multiplexing (DFT-OFDM) symbol and maintains the same column assignment and mechanisms as in Release-8.

If the control data is CQI/PMI, the encoder 106 may multiplex 914 the mixed coded CQI/PMI from the top down in a slot of a PUSCH resource. Multiplexing refers to adding coded control data (CQI/PMI) in front of coded data, where the tail of coded data is punctured. The term rate matching be used (however, the rate matching applies to one step earlier when the data output is rate matched to fill all PUSCH resources; then if CQI/PMI multiplexing is applied, the tail is punctured (it is a rate matching also) to give space for coded CQI/PMI). After multiplexing, the symbols may be mapped to all resource elements of the PUSCH. For CQP/PMI mixed coding, the repetition data block should be selected to achieve the best data coding performance after mixed decoding. The nominal turbo output has a coding rate of 1/3. The encoder 106 may determine 916 whether the rate matched output has a coding rate less than 1/3. If the rate matched output has a coding rate greater than 1/3 (i.e., puncturing on the turbo output is applied), the encoder 106 may use 920 the data block on subcarriers that is immediately below the control multiplexing region as the superposition coding base. The superposition coding base is the repetition data block. The superposition coding base may also be referred to as the coding base (i.e., the channel) for the coded control sequence.

After the mixed decoding with CQI/PMI feedback, another copy of this data block can be recovered to enhance the data decoding. For a codeword with an initial transmission, redundant version 0 may be used and the data output starts with the systematic bits. Repetition on the systematic bits may achieve better performance than on parity bits.

If the rate matched data output has a code rate less than 1/3 (i.e., some repetition of the turbo output is already applied), the encoder 106 may use 918 the data block on subcarriers that is immediately below the turbo code repetition part as the repetition data block for the mixed CQI/PMI coding. Thus, the recovered repetition data block after the mixed coding of CQI/PMI feedback may enhance extended bits instead of the already repeated bits. If the rate matched data output has a code rate less than 1/3, the repetition block used for the mixed coding should be selected.

The encoder 106 may then obtain 922 the mixed CQI/PMI control output as the XOR output of the given data block and the expanded CQI/PMI control coding output. This ensures that the differential coded symbol is in the same DFT-OFDM symbol. All symbols mapped to the PUSCH resource are in modulation order of $Q_m$, which is decided by the modulation and coding scheme (MCS) setting and the PUSCH resource allocation (i.e., the number of physical resource blocks). The XOR operation is performed between a symbol of the coded control and a symbol of the repetition data block. We may use d as a symbol of $Q_m$ bits in the repetition data region and c as a symbol of $Q_m$ bits in the coded control. The XOR output d+c is a symbol of $Q_m$ bits of mixed coding output, where + is a binary XOR operation. The output symbol d+c is mapped to the symbols in the mixed control region which time aligns with the repetition data symbol d (i.e., these two symbols are in the same SC-FDMA symbol).

In LTE and future releases, a codeword or codewords is transmitted in one sub-frame on the PUSCH resource. One sub-frame includes two consecutive slots on one layer. In FIGS. 11-18, although only one slot is shown, the same mapping method is applied on the other slot.

Figure 11:
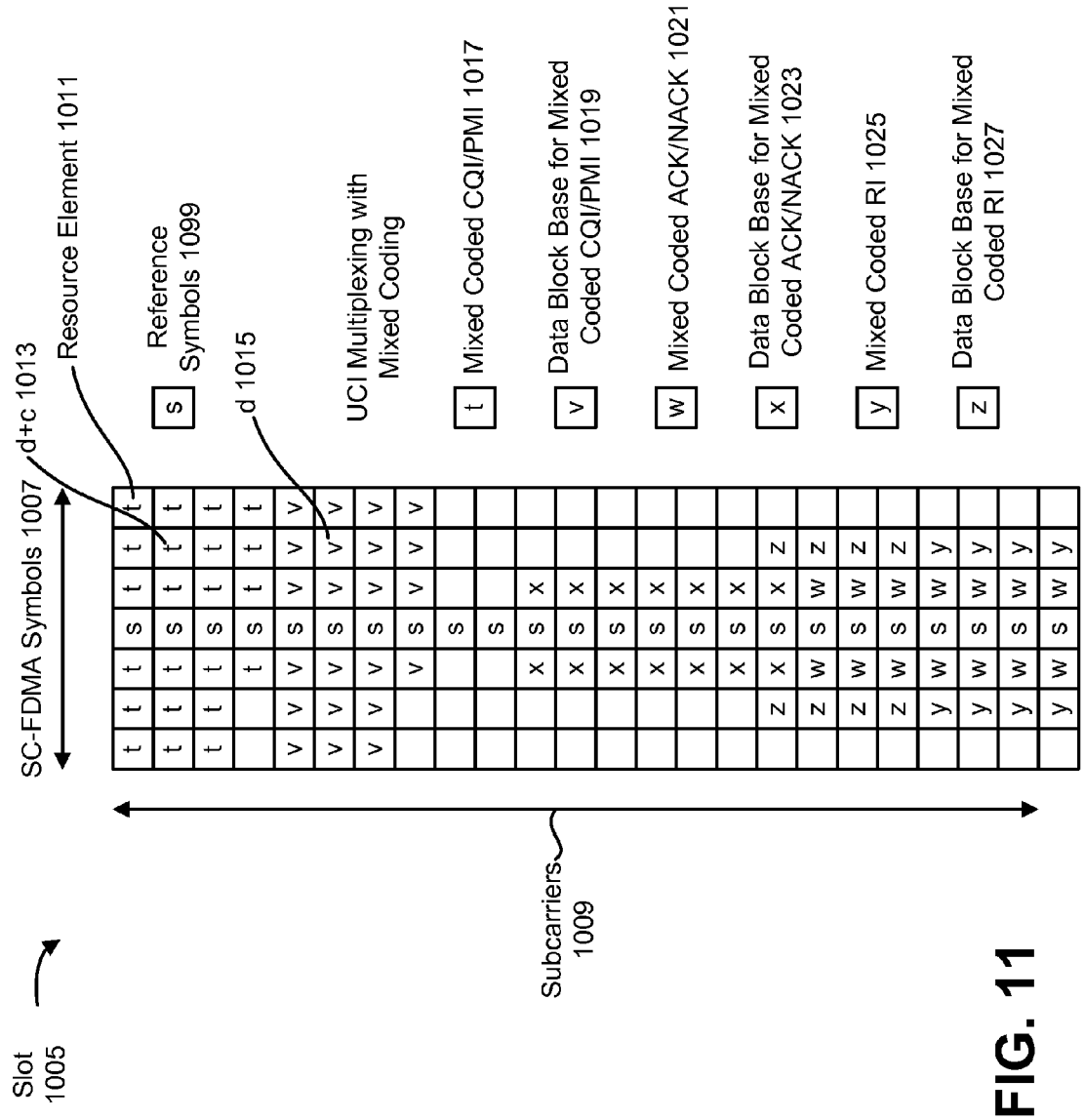
FIG. 11 is a block diagram illustrating a slot of a PUSCH subframe using UCI multiplexing with mixed coding.

FIG. 11 is a block diagram illustrating a slot 1005 of a PUSCH subframe using UCI multiplexing with mixed coding. The slot 1005 may use the multiplexing method and data block coding base selection on one layer with mixed coding discussed above in relation to FIG. 10. Each slot 1005 may include subcarriers 1009 and SC-FDMA symbols 1007, where each subcarrier 1009 of each SC-FDMA symbol 1007 is a resource element 1011. The number of SC-FDMA symbols $N_{syms}^{UL}$ in a slot 1005 depends on the cyclic prefix setting. $N_{syms}^{UL}$ is 7 with normal prefix and 6 for extended prefix. Each layer of each slot 1005 may include one or more reference symbols 1099.

The encoder 106 may fill up the resource elements 1011 of the slot 1005 from the top down with the mixed coded CQI/PMI 1017. The encoder 106 may not fill up the resource elements 1011 that are already filled with reference symbols 1099. The data block base for the mixed coded CQI/PMI 1019 is also illustrated. The data block base for the mixed coded CQI/PMI 1019 may be located directly below the mixed coded CQI/PMI 1017 in the slot 1005, or it could be located in the middle of the data block, depending on the rate matched data coding rate setting. The encoder 106 may fill up the required columns of the slot 1005 with the mixed coded ACK/NACK 1021 from the bottom up. The data block base for mixed coded ACK/NACK 1023 is also illustrated directly above the mixed coded ACK/NACK 1021 in the slot 1005. The encoder 106 may fill up the required columns of the slot 1005 with the mixed coded RI 1025. The data block base for the mixed coded R 10271 is also illustrated directly above the mixed coded RI 1025 in the slot 1005.

The symbol d 1015 may be copied and binary XORed with the coded control output c to obtain the mixed output d+c 1013. The mixed output d+c 1013 may then be transmitted in the mixed coding region. All symbols mapped to the PUSCH resource are in modulation order of $Q_m$, which is decided by the modulation and coding scheme (MCS) setting and the PUSCH resource allocation (i.e., the number of physical resource blocks). The XOR operation is performed between a symbol of the coded control and a symbol of the repetition data block. As discussed above, d is a symbol of $Q_m$ bits in the repetition data region and c is a symbol of $Q_m$ bits of the coded control. The XOR output d+c is a symbol of $Q_m$ bits of mixed coding output, where + is a binary XOR operation. The output symbol d+c is mapped to the symbols in the mixed control region, which time aligns with the repetition data symbols d (i.e., these two symbols are in the same SC_FDMA symbol).

Figure 12:
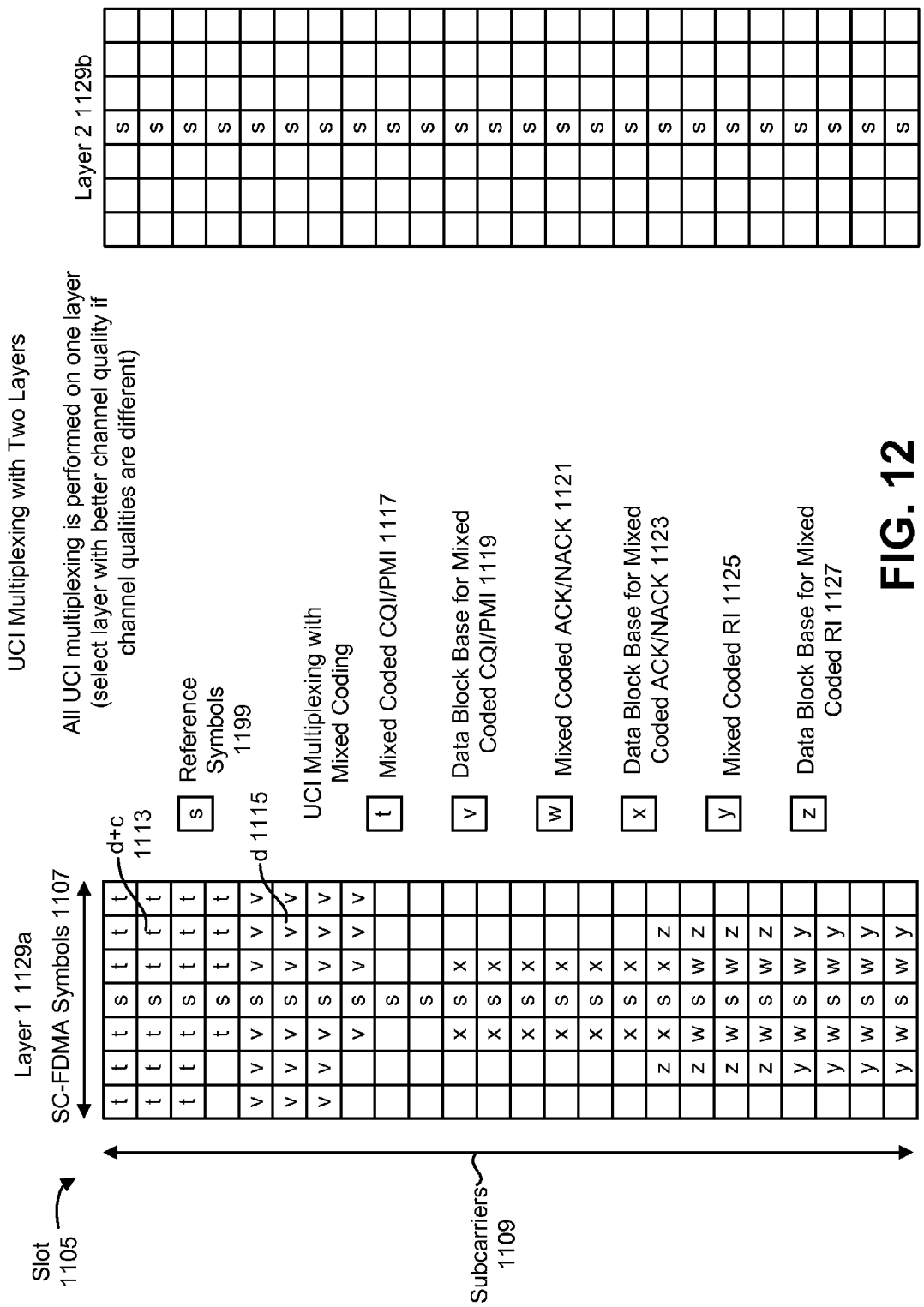
FIG. 12 is a block diagram illustrating a slot of a PUSCH subframe using UCI multiplexing with two layers.

FIG. 12 is a block diagram illustrating a slot 1105 of a PUSCH subframe using UCI multiplexing with two layers 1129. Each slot 1105 may include subcarriers 1109 and SC-FDMA symbols 1107, where each subcarrier 1109 of each SC-FDMA symbol 1107 is a resource element 1011. Each layer 1129 of each slot 1105 may include one or more reference symbols 1199.

In LTE Release-10 and beyond, a wireless communication device 104 can use multiple antennas 103 for data transmission, thus allowing single user multiple input and multiple output (SU-MIMO). A wireless communication device 104 can transmit the UCI by multiplexing the UCI on one or multiple codewords (CW) (i.e., transport blocks (TBs)). Each codeword may be on one or multiple layers 1129.

The basic rule is to apply the UCI multiplexing method of FIG. 10 on each layer 1129 that allows UCI multiplexing. The mapping method on each layer 1129 that is selected to have UCI multiplexing may be the same as in the single antenna transmission case. However, the number of coded control symbols Q' required for the mixed control coding may be calculated with k*β-offset instead of with β-offset as in Release-8 UCI multiplexing. The CQI/PMI may be multiplexed on only one codeword with an extension of time alignment across layers 1129 when two layers 1129 are used. The ACK/NACK and RI may be mapped on all codewords of all layers. The slot 1105 of FIG. 12 may use the UCI multiplexing method and data block coding base selection on only one layer 1129 with mixed coding.

In one configuration where two layers 1129*a-b* are available, all UCI multiplexing may be performed on one layer 1129. Mapping to one layer 1129 is simpler. However, mapping to two layers 1129 has potential diversity gain. Mapping to one layer 1129 and to two layers 1129 will lead to similar performance with the mixed coding approach. If the two layers 1129 have different channel qualities, UCI multiplexing may be applied on the layer 1129 with the better channel quality. If a scale factor k is given, the mixed coding block size may be fixed. Thus, the layer 1129 with the better channel quality may be used to minimize the differential decoding error. However, using the layer 1129 with the better channel quality may reduce the required k value, thereby reducing the size of the mixed coding block.

The UCI mixed coding block and the repetition data block mapping for two layers 1129 may be similar to the single antenna transmission case on the selected layer 1129. Thus, the mixed coded CQI/PMI 1117 may be mapped from the top down in the slot 1105 on the first layer 1129*a* (i.e., Layer 1). The repetition data block (i.e., data block base for the mixed coded CQI/PMI 1119) may be the block right after the mixed coded CQI/PMI block 1117. The symbol d 1115 may be copied and binary XORed with the coded control output c to obtain the mixed output d+c 1113. The mixed output d+c 1113 may then be transmitted in the mixed coding region.

The mixed coded ACK/NACK 1121 and mixed coded RI 1125 may be mapped from the bottom up on Layer 1 1129*a* in the required columns. The repetition data block base for the mixed coded ACK/NACK 1123 may be directly above the mapped mixed coded ACK/NACK 1123 block in the slot 1105. The repetition data block base for the mixed coded RI 1127 may be directly above the mixed coded RI 1125 in the slot 1105.

The column set for insertion of rank information from 3GPP TS36.212 is shown in Table 1.

TABLE 1

| CP Configuration | Column Set |
| --- | --- |
| Normal | {1, 4, 7, 10} |
| Extended | {0, 3, 5, 8} |

The column set for insertion of hybrid automatic repeat request (HARQ)-ACK information from 3GPP TS36.212 is shown in Table 2.

TABLE 2

| CP Configuration | Column Set |
| --- | --- |
| Normal | {2, 3, 8, 9} |
| Extended | {1, 2, 6, 7} |

Figure 13:
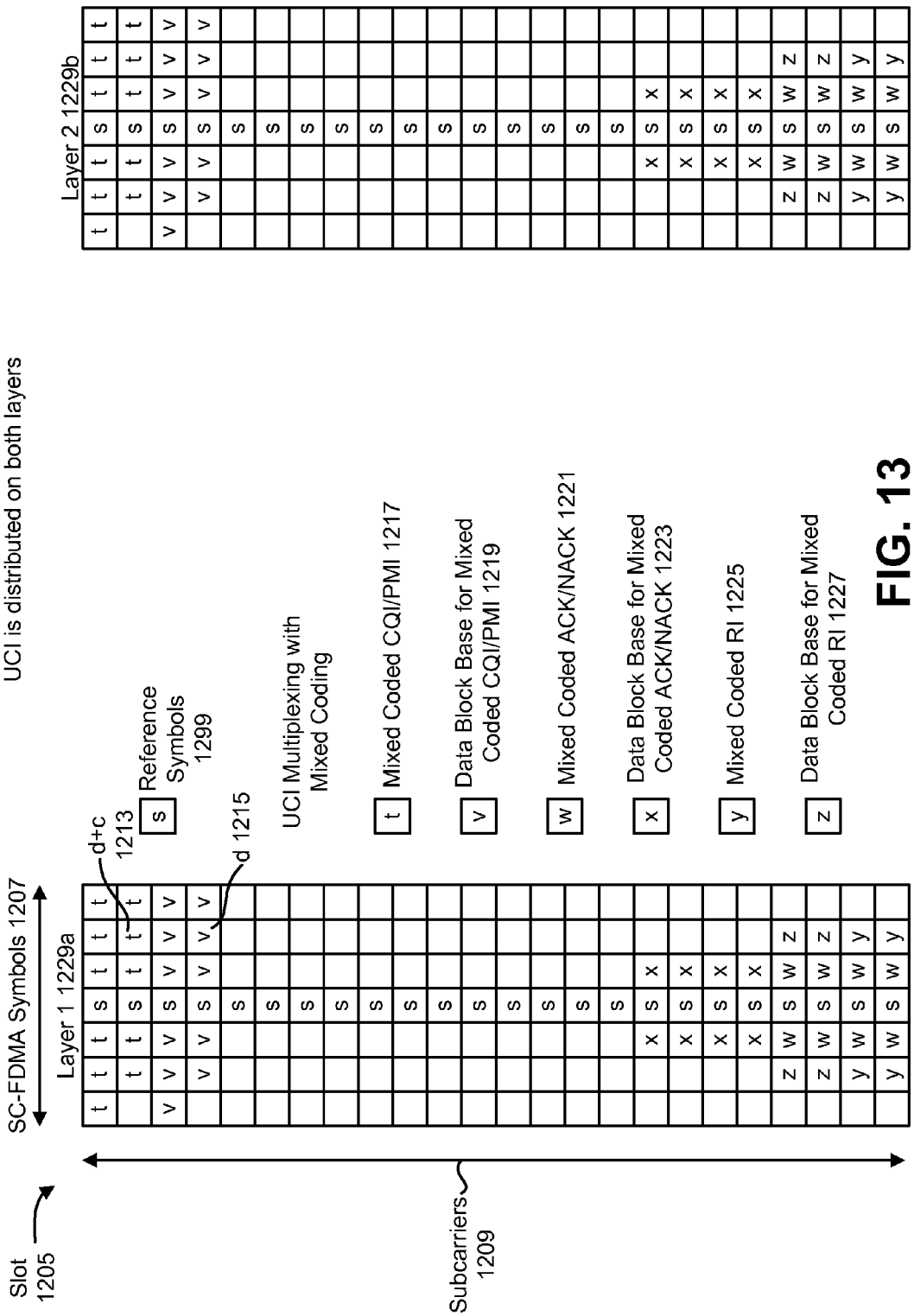
FIG. 13 is a block diagram illustrating another slot of a PUSCH subframe using UCI multiplexing with two layers.

FIG. 13 is a block diagram illustrating another slot 1205 of a PUSCH subframe using UCI multiplexing with two layers 1229. The slot 1205 may include SC-FDMA symbols 1207 and subcarriers 1209 that make up resource elements 1011. Some of the resource elements 1011 may be filled with reference symbols 1299. A codeword may be mapped on two layers 1229. In FIG. 13, the UCI may be distributed on both Layer 1 1229*a* and layer 2 1229*b*. The UCI may be distributed on both layers 1229 and then the mapping method (i.e., the method of FIG. 10) may be applied on each layer 1229.

The mixed coded CQI/PMI 1217 may be mapped from the top down on both Layer 1 1229*a* and Layer 2 1229*b*. The data block base for the mixed coded CQI/PMI 1219 may be directly below the mapped mixed coded CQI/PMI 1217 on each layer 1229. The mixed coded ACK/NACK 1221 may be mapped from the bottom up on both Layer 1 1229*a* and Layer 2 1229*b* in the required columns. The data block base for mixed coded ACK/NACK 1223 may be directly above the mapped mixed coded ACK/NACK 1221 on each layer 1229. The mixed coded RI 1225 may be mapped from the bottom up on both Layer 1 1229*a* and Layer 2 1229*b* in the required columns. The data block base for the mixed coded RI 1227 may be directly above the mapped mixed coded RI 1225 on each layer 1229.

The symbol d 1215 may be copied and binary XORed with the coded control output c to obtain the mixed output d+c 1213. The mixed output d+c 1213 may then be transmitted in the mixed coding region.

Figure 14:
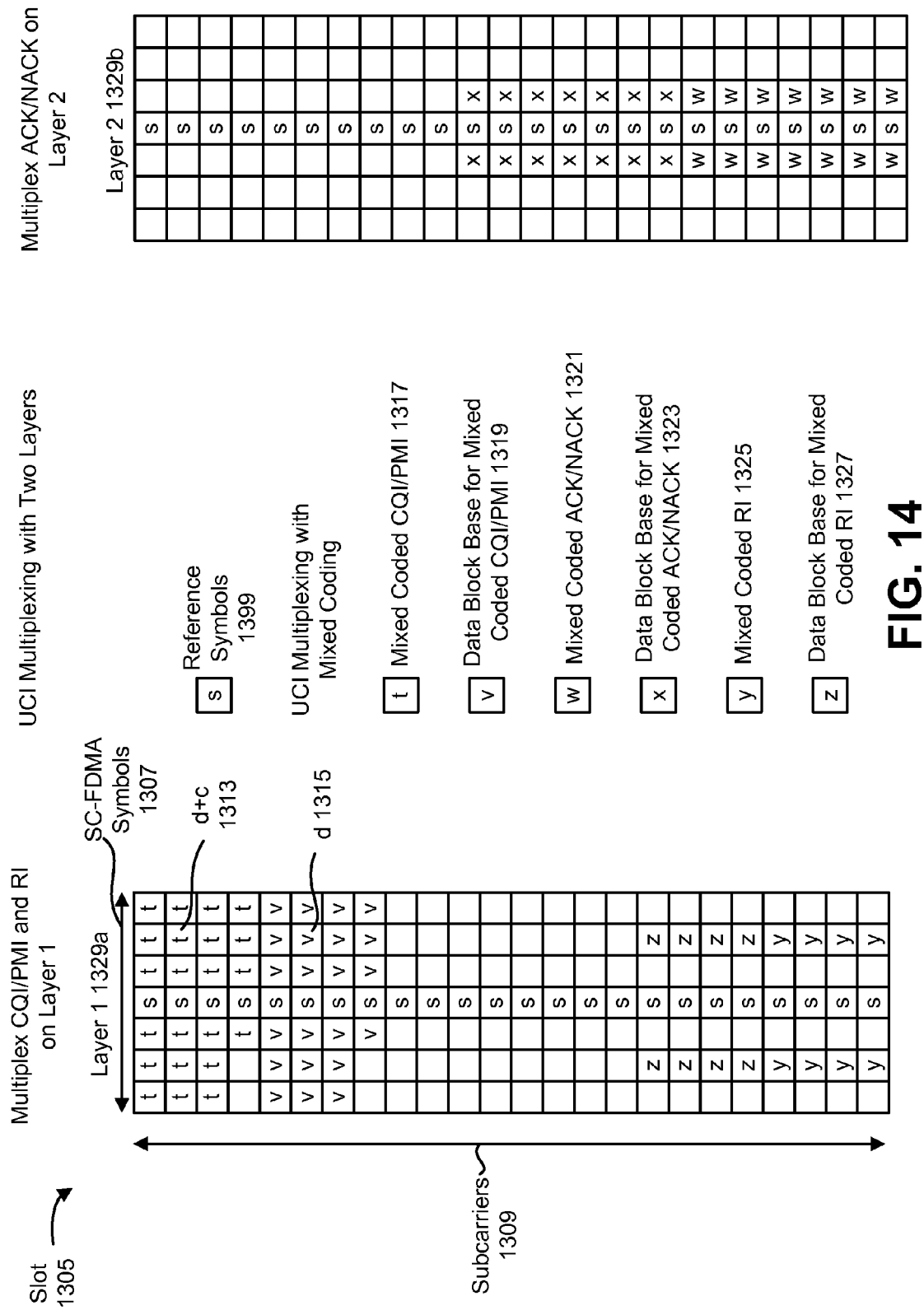
FIG. 14 is a block diagram also illustrating a slot of a PUSCH subframe using UCI multiplexing with two layers.

FIG. 14 is a block diagram also illustrating a slot 1305 of a PUSCH subframe using UCI multiplexing with two layers 1329. The slot 1305 may include SC-FDMA symbols 1307 and subcarriers 1309 that make up resource elements 1011. Some of the resource elements 1011 may be filled with reference symbols 1399. A codeword may be mapped on Layer 1 1329*a* and Layer 2 1329*b*. In FIG. 14, the different types of UCI may be multiplexed on different layers 1329. For example, the mixed coded CQI/PMI 1317 may be mapped from the top down on Layer 1 1329*a*. The data block base for the mixed coded CQI/PMI 1321 may be directly below the mapped mixed coded CQI/PMI 1317 on Layer 1 1329*b*. The mixed coded RI may be mapped from the bottom up on the required column of Layer 1. The data block base for the mixed coded RI may be directly above the mapped mixed coded RI on Layer 1.

The mixed coded ACK/NACK may be mapped from the bottom up on the required column of Layer 2. The data block base for the mixed coded ACK/NACK may be directly above the mapped mixed coded ACK/NACK on Layer 2. Other configurations of multiplexing different types of the UCI on different layers may also be used. For example, the mixed coded CQI/PMI and the mixed coded ACK/NACK may be mapped on Layer 1 while the mixed coded RI is mapped on Layer 2.

The symbol d 1315 may be copied and binary XORed with the coded control output c to obtain the mixed output d+c 1313. The mixed output d+c 1313 may then be transmitted in the mixed coding region.

Figure 15:
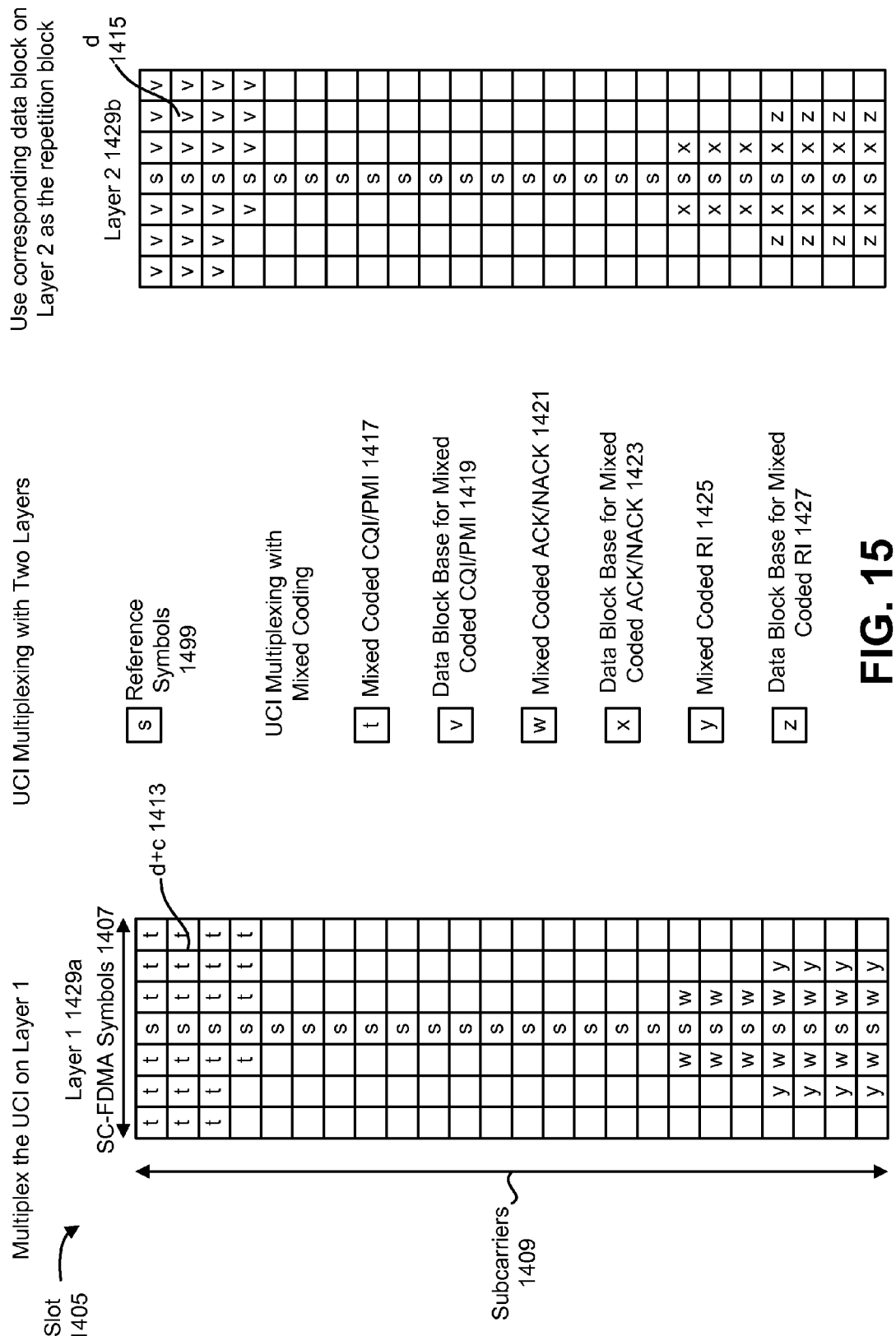
FIG. 15 is a block diagram illustrating a slot of a PUSCH subframe using UCI multiplexing with mixed coding implemented.

FIG. 15 is a block diagram illustrating a slot 1405 of a PUSCH subframe using UCI multiplexing with mixed coding implemented. The slot 1405 may include SC-FDMA symbols 1407 and subcarriers 1409 that make up resource elements 1011. Some of the resource elements 1011 may be filled with reference symbols 1499. The slot 1405 may have a first layer (Layer 1 1429a) and a second layer (Layer 2 1429b). One codeword may be carried on Layer 1 1429a and Layer 2 1429b. The UCI may be mapped on Layer 1 1429a and the corresponding data block base may be mapped on Layer 2 1429b as the repetition block.

Thus, the mixed coded CQI/PMI 1417 may be mapped from the top down on Layer 1 1429a. The data block base for the mixed coded CQI/PMI 1419 may be mapped from the top down on Layer 2 1429b. The mixed coded ACK/NACK 1421 may be mapped from the bottom up in the required columns of Layer 1 1429a. The data block base for the mixed coded ACK/NACK 1423 may be in the corresponding resource elements 1011 of Layer 2 1429b. The mixed coded RI 1425 may be mapped from the bottom up in the required columns of Layer 1 1429a. The data block base for the mixed coded RI 1427 may be in the corresponding resource elements 1011 of Layer 2 1429b.

The symbol d 1415 may be copied and binary XORed with the coded control output c to obtain the mixed output d+c 1413. The mixed output d+c 1413 may then be transmitted in the mixed coding region.

Figure 16:
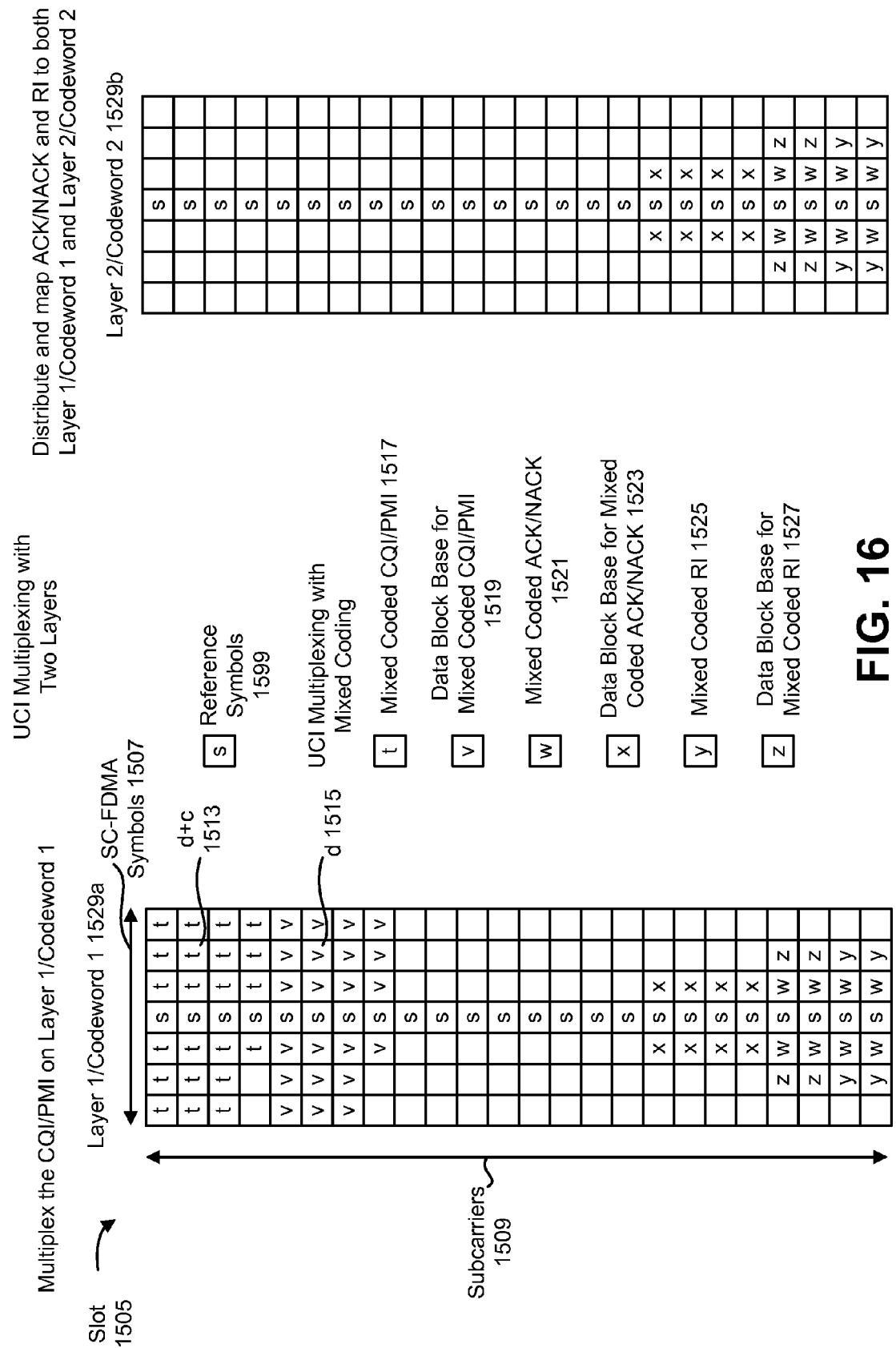
FIG. 16 is a block diagram illustrating a slot of a PUSCH subframe using UCI multiplexing with two codewords on two layers.

FIG. 16 is a block diagram illustrating a slot 1505 of a PUSCH subframe using UCI multiplexing with two codewords on two layers 1529. The slot 1505 may include SC-FDMA symbols 1507 and subcarriers 1509 that make up resource elements 1011. Some of the resource elements 1011 may be filled with reference symbols 1599. When two codewords are transmitted on two layers 1529, each layer 1529 has a different codeword. Mapping the UCI to one codeword may simplify the decoding process. However, mapping the UCI to one codeword may introduce data performance degradation only on the codeword with the UCI multiplexing. When multiplexing to only one codeword is used, the UCI should be multiplexed on the codeword with the higher MCS setting. The UCI mixed coding block and the repetition data block mapping performed on the selected layer 1529 is similar to the mapping used on a single antenna transmission.

Applying UCI multiplexing on multiple layers 1529 may be more complicated to decode and may bring performance loss on both codewords. However, the performance loss to each codeword will be smaller than the loss from UCI multiplexing on one codeword. In one configuration, different types of UCI can be multiplexed with different methods. For example, the mixed coded CQI/PMI 1517 may be multiplexed on only one codeword while the mixed coded ACK/NACK 1521 and the mixed coded RI 1525 are mapped on all codewords across all layers 1529.

In one configuration, the mixed coded CQI/PMI 1517 may be multiplexed on only one codeword and one layer 1529 (i.e., Layer 1 1529a) from the top down. The data block base for the mixed coded CQI/PMI 1519 is illustrated as the data blocks immediately below the mapped mixed coded CQI/PMI 1517 in Layer 1 1529a. The mixed coding method and the repetition data block decision is thus the same as that used above in relation to FIG. 10.

The mixed coded ACK/NACK 1521 and the data block base for the mixed coded ACK/NACK 1523 may be distributed and mapped between Layer 1/Codeword 1 1529a and Layer 2/Codeword 2 1529b. Likewise, the mixed coded RI 1525 and the data block base for the mixed coded RI 1527 may be distributed and mapped between Layer 1/Codeword 1 1529a and Layer 2/Codeword 2 1529b. Thus, the mixed coding method and repetition data block method for mixed coded ACK/NACK 1521 and mixed coded RI 1525 as discussed above in relation to FIG. 10 may be applied on each layer/codeword.

In one configuration, the UCI may be distributed across the first codeword and the second codeword (not shown). The mapping method of FIG. 10 may then be applied for each layer/codeword 1529. This is similar to the UCI multiplexing illustrated in FIG. 13. In another configuration, the different types of UCI may be multiplexed on different layers 1529 (not shown). For example, the mixed coded CQI/PMI 1517 and the mixed coded RI 1525 may be mapped to the first layer 1529a and the first codeword using the mapping method of FIG. 10. The data block base for the mixed coded CQI/PMI 1519 and the data block base for the mixed coded RI 1527 may also be mapped on the first layer 1529a. The mixed coded ACK/NACK 1521 may be mapped to the second layer 1529b and the second codeword using the mapping method of FIG. 10. The data block base for the mixed coded ACK/NACK 1523 may be mapped to the second layer 1529b and the second codeword.

The symbol d 1515 may be copied and binary XORed with the coded control output c to obtain the mixed output d+c 1513. The mixed output d+c 1513 may then be transmitted in the mixed coding region.

Figure 17:
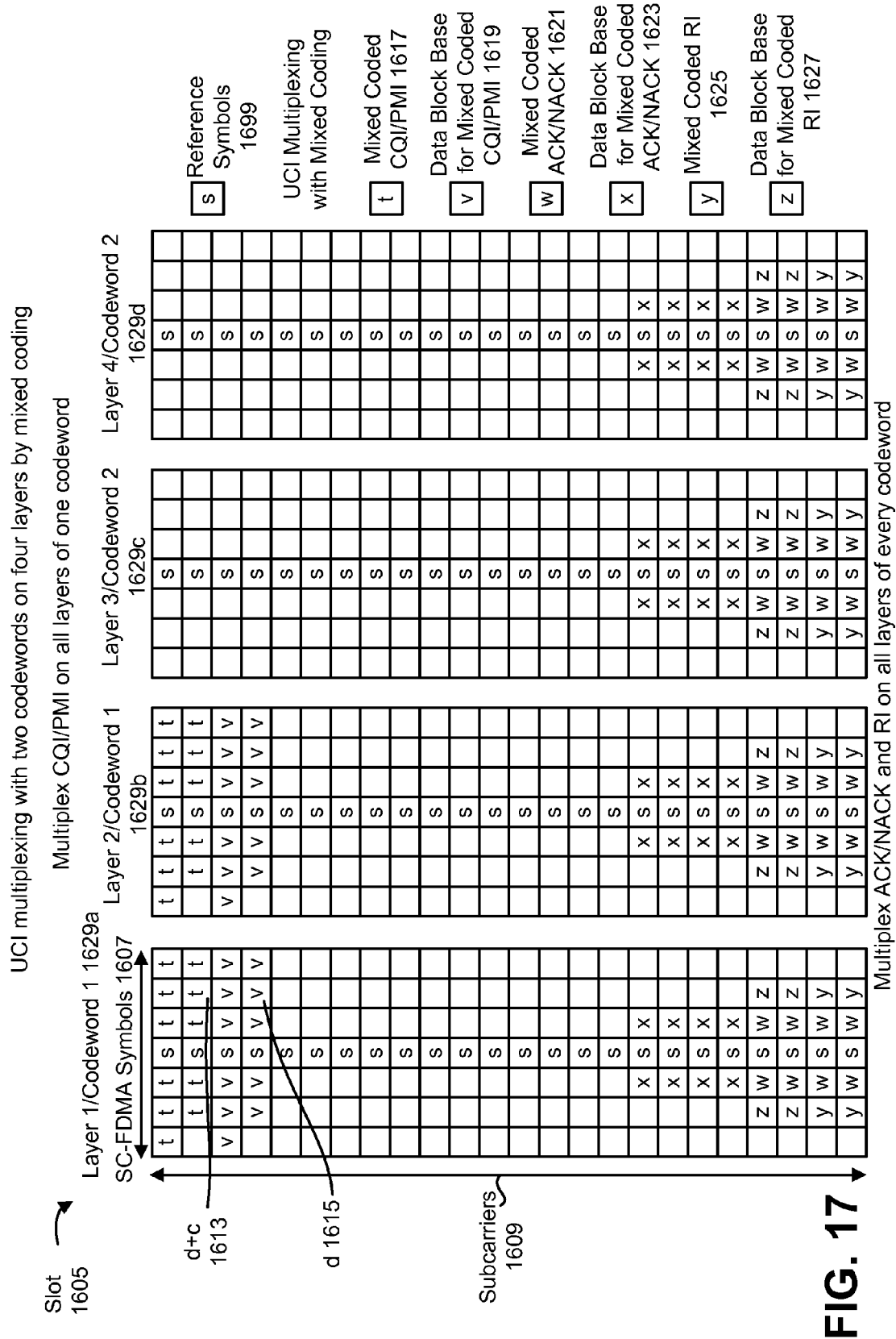
FIG. 17 is a block diagram illustrating a slot of a PUSCH subframe with two codewords mapped on four layers.

FIG. 17 is a block diagram illustrating a slot 1605 of a PUSCH subframe with two codewords mapped on four layers 1629. The slot 1605 may include SC-FDMA symbols 1607 and subcarriers 1609 that make up resource elements 1011. Some of the resource elements 1011 may be filled with reference symbols 1699. In general, the same process for UCI multiplexing may be performed on multiple (M≥1) codewords over multiple (N≥M) layers 1629. The UCI may be multiplexed on one codeword over one or multiple layers 1629. For example, the mixed coded CQI/PMI 1617 may be multiplexed on Layer 1 1629a and Layer 2 1629b of Codeword 1 along with the data block base for the mixed coded CQI/PMI 1619. The mixed coded ACK/NACK 1621 and the mixed coded RI 1625 (and the respective data block bases) are mapped on Layer 1 1629a and Layer 2 1629b of Codeword 1 and Layer 3 1629c and Layer 4 1629d of Codeword 2.

As another example, the UCI may be multiplexed in a manner similar to that of the slot 1305 of FIG. 14. The different types of UCI may be multiplexed on different layers 1629 (e.g., the mixed coded CQI/PMI 1617 may be mapped from the top down on Layer 1 1629a with the data block base for the mixed coded CQI/PMI 1619 directly below the mapped mixed coded CQI/PMI 1617 on Layer 1 1629a, the mixed coded RI 1625 may be mapped from the bottom up on the required columns of Layer 1 1629a with the data block base for the mixed coded RI 1627 directly above the mapped mixed coded RI 1625 on Layer 1 1629a, and the mixed coded ACK/NACK 1621 may be mapped from the bottom up in the required columns of Layer 2 1629b with the data block base for the mixed coded ACK/NACK 1623 directly above the mapped mixed coded ACK/NACK 1621 on Layer 1 1629a). Many other variations of multiplexing the different types of UCI on multiple layers 1629 may also be used.

The symbol d 1615 may be copied and binary XORed with the coded control output c to obtain the mixed output d+c 1613. The mixed output d+c 1613 may then be transmitted in the mixed coding region.

Figure 18:
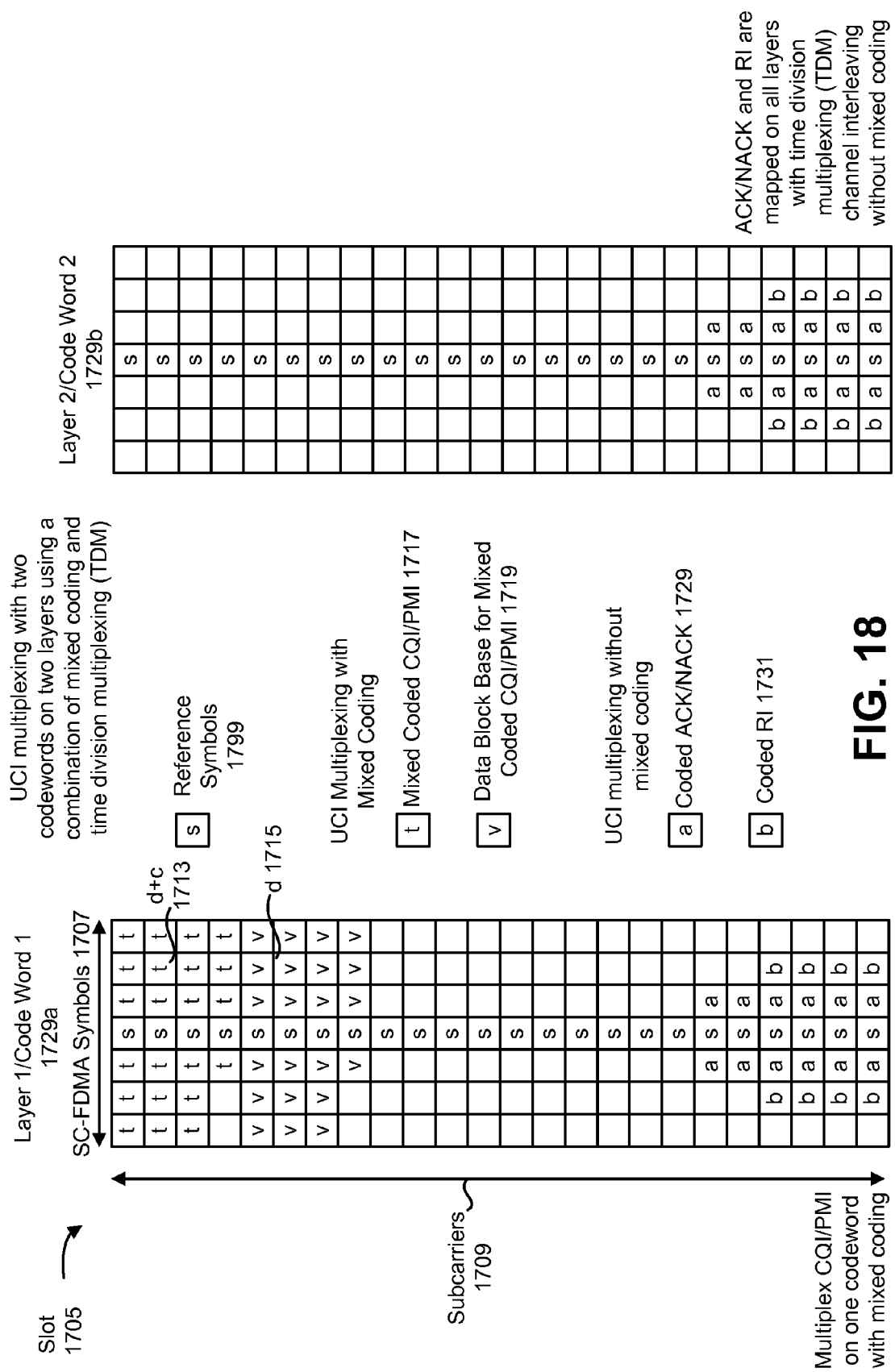
FIG. 18 is a block diagram illustrating a slot of a PUSCH subframe with two codewords mapped on two layers using UCI multiplexing by a combination of mixed coding and time division multiplexing (TDM)

FIG. 18 is a block diagram illustrating a slot 1705 of a PUSCH subframe with two codewords mapped on two layers 1729 using UCI multiplexing by a combination of mixed coding and time division multiplexing (TDM). The slot 1705 may include SC-FDMA symbols 1707 and subcarriers 1709 that make up resource elements 1011. Some of the resource elements 1011 may be filled with reference symbols 1799. Codeword 1 may be mapped to Layer 1 1729*a* and Codeword 2 may be mapped to Layer 2 1729*b*. Mixed coding does not have to be applied to all control messages. In one configuration, mixed coding may be applied on a subset of control messages. For example, mixed coding may be applied for the CQI/PMI while time division multiplex (TDM) channel interleaving is applied for the ACK/NACK and the RI.

The mixed coded CQI/PMI 1717 may be multiplexed on Codeword 1 and Layer 1 1729*a* from the top down. The data block base for the mixed coded CQI/PMI 1719 may be located directly below the mixed coded CQI/PMI 1717. UCI multiplexing without mixed coding may be applied to the ACK/NACK and the RI. The coded ACK/NACK 1729 may be mapped on both Layer 1 1729*a* and Layer 2 1729*b* from the bottom up in the required columns. The coded RI 1731 may be mapped on both Layer 1 1729*a* and Layer 2 1729*b* from the bottom up in the required columns. Thus, the CQI/PMI is multiplexed on one layer 1729 with mixed coding while the ACK/NACK and the RI are mapped on all layers 1729 with time division multiplex (TDM) channel interleaving without mixed coding.

The symbol d 1715 may be copied and binary XORed with the coded control output c to obtain the mixed output d+c 1713. The mixed output d+c 1713 may then be transmitted in the mixed coding region.

Figure 19:
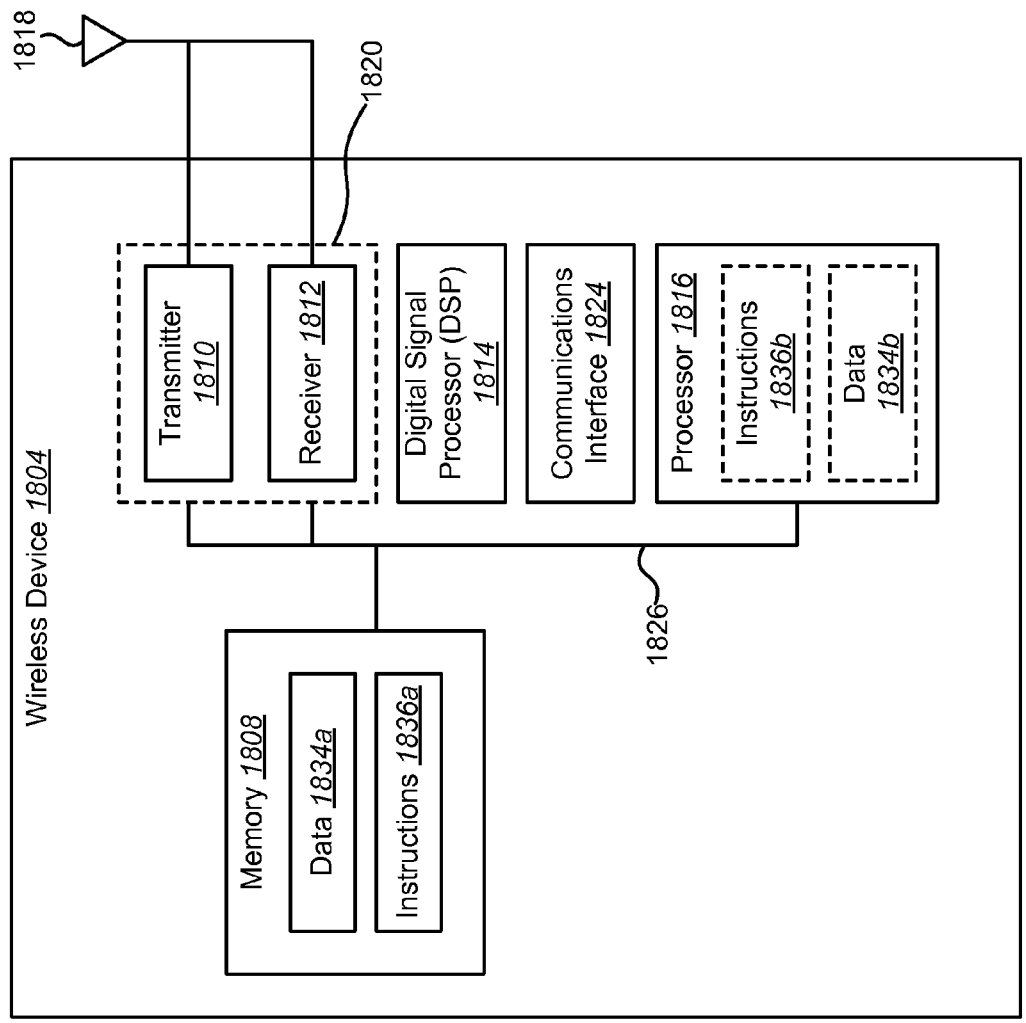
FIG. 19 is a block diagram of a wireless device in accordance with one configuration of the described systems and methods.

FIG. 19 is a block diagram of a wireless device 1804 in accordance with one configuration of the described systems and methods. The wireless device 1804 may be a wireless communication device 104, which may also be referred to as user equipment, a mobile station, a subscriber station, an access terminal, a remote station, etc. The wireless device 1804 may also be a base station 102, which may also be referred to as an eNodeB, a base station controller, a base station transceiver, etc. The wireless device 1804 may include a transceiver 1820 that includes a transmitter 1810 and a receiver 1812. The transceiver 1820 may be coupled to one or more antennas 1818. The wireless device 1804 may further include a digital signal processor (DSP) 1814, a general purpose processor 1816, memory 1808, and a communications interface 1824. The various components of the wireless device 1804 may be included within a housing.

The processor 1816 may control operation of the wireless device 1804. The processor 1816 may also be referred to as a CPU. The memory 1808, which may include both read-only memory (ROM) and random access memory (RAM), provides instructions 1836*a* and data 1834*a* to the processor 1816. A portion of the memory 1808 may also include non-volatile random access memory (NVRAM). The memory 1808 may include any electronic component capable of storing electronic information, and may be embodied as ROM, RAM, magnetic disk storage media, optical storage media, flash memory, on-board memory included with the processor 1816, EPROM memory, EEPROM memory, registers, a hard disk, a removable disk, a CD-ROM, etc.

The memory 1808 may store program instructions 1836*a* and other types of data 1834*a*. The program instructions 1836*a* may be executed by the processor 1816 to implement some or all of the methods disclosed herein. The processor 1816 may also use the data 1834*a* stored in the memory 1808 to implement some or all of the methods disclosed herein. As a result, instructions 1836*b* and data 1834*b* may be loaded and/or otherwise used by the processor 1816.

In accordance with the disclosed systems and methods, the antenna 1818 may receive downlink signals that have been transmitted from a nearby communications device, such as a base station 102, or uplink signals that have been transmitted from a nearby communications device, such as a wireless communication device 104. The antenna 1818 provides these received signals to the transceiver 1820, which filters and amplifies the signals. The signals are provided from the transceiver 1820 to the DSP 1814 and to the general purpose processor 1816 for demodulation, decoding, further filtering, etc.

The various components of the wireless device 1804 are coupled together by a bus system 1826, which may include a power bus, a control signal bus, and a status signal bus in addition to a data bus. However, for the sake of clarity, the various busses are illustrated in FIG. 18 as the bus system 1826.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for multiplexing uplink control information (UCI) on a physical uplink shared channel (PUSCH), comprising:
   coding control data over a repeated portion of user data;
   mapping the coded control data to a PUSCH resource;
   mapping a data block base for the coded control data in the PUSCH resource; and
   transmitting the control data and the user data on the PUSCH resource,
wherein the PUSCH resource comprises a slot, wherein the control data comprises channel quality indicators (CQI)/precoding matrix indicators (PMI), acknowledgement/negative-acknowledgement (ACK/NACK) and rank indicators (RI), and further comprising:
   multiplexing mixed coded CQI/PMI from the top down of the slot;
   using a first data block as a superposition coding base for the mixed coded CQI/PMI;
   channel interleaving mixed coded ACK/NACK from the bottom up in a first plurality of required columns of the slot;
   using a second data block as a superposition coding base for the mixed coded ACK/NACK;
   channel interleaving mixed coded RI from the bottom up in a second plurality of required columns of the slot; and
   using a third data block as a superposition coding base for the mixed coded RI.

2. The method of claim 1, further comprising obtaining a mixed CQI/PMI control output as an XOR output of the first data block and an expanded CQI/PMI control coding output.

3. The method of claim 1, further comprising obtaining a mixed ACK/NACK control output as an XOR output of the second data block and expanded ACK/NACK coding outputs.

4. The method of claim 1, further comprising obtaining a mixed RI control output as an XOR output of the third data block and expanded RI coding outputs.

5. The method of claim 1, wherein a rate matched data output has a coding rate greater than 1/3, and wherein the first data block is on subcarriers that are immediately below a control multiplexing region as the superposition coding base.

6. The method of claim 1, wherein a rate matched data output has a coding rate less than 1/3, and wherein the first data block is on subcarriers that are immediately below a turbo code repetition part.

7. The method of claim 1, wherein the second data block is immediately above the channel interleaved mixed coded ACK/NACK, and wherein the third data block is immediately above the channel interleaved mixed coded RI.

8. The method of claim 1, wherein the slot comprises a first layer and a second layer, wherein a codeword is mapped on both layers, and wherein the method is performed on the first layer.

9. The method of claim 1, wherein the slot comprises a first layer and a second layer, wherein a codeword is mapped on both layers, wherein the UCI is distributed on the first layer and the second layer, and wherein the method is performed separately for each layer.

10. The method of claim 1, wherein the slot comprises a first layer and a second layer, wherein a codeword is mapped on both layers, wherein the mixed coded CQI/PMI is multiplexed from the top down of the first layer of the slot; wherein the mixed coded RI is mapped from the bottom up in one of the plurality of required columns of the first layer, and wherein the mixed coded ACK/NACK is mapped from the bottom up in a first plurality of required columns of the second layer.

11. The method of claim 10, wherein the first data block is on subcarriers that are immediately below the multiplexed mixed coded CQI/PMI, wherein the second data block is on subcarriers immediately above the channel interleaved mixed coded ACK/NACK, and wherein the third data block is immediately above the channel interleaved mixed coded RI.

12. The method of claim 10, wherein the first data block is on subcarriers of the second layer corresponding to the multiplexed mixed coded CQI/PMI, wherein the second data block is on subcarriers of the second layer corresponding to the multiplexed mixed coded ACK/NACK, and wherein the third data block is on subcarriers of the second layer corresponding to the multiplexed mixed coded RI.

13. The method of claim 1, wherein the slot comprises a first layer and a second layer, wherein a first codeword is mapped to the first layer, wherein a second codeword is mapped to the second layer, and wherein the method is performed on the first layer.

14. The method of claim 1, wherein the slot comprises a first layer and a second layer, wherein a first codeword is mapped to the first layer, wherein a second codeword is mapped to the second layer, wherein the UCI is distributed on the first layer and the second layer, and wherein the method is performed separately for each layer.

15. The method of claim 1, wherein the slot comprises a first layer and a second layer, wherein a first codeword is mapped to the first layer, wherein a second codeword is mapped to the second layer, wherein the mixed coded CQI/PMI is multiplexed from the top down of the first layer of the slot; wherein the mixed coded RI is mapped from the bottom up in one of the plurality of required columns of the first layer, and wherein the mixed coded ACK/NACK is mapped from the bottom up in a first plurality of required columns of the second layer.

16. The method of claim 15, wherein the first data block is on subcarriers that are immediately below the multiplexed mixed coded CQI/PMI, wherein the second data block is on subcarriers immediately above the channel interleaved mixed coded ACK/NACK, and wherein the third data block is immediately above the channel interleaved mixed coded RI.

17. The method of claim 15, wherein the first data block is on subcarriers of the second layer corresponding to the multiplexed mixed coded CQI/PMI, wherein the second data block is on subcarriers of the second layer corresponding to the multiplexed mixed coded ACK/NACK, and wherein the third data block is on subcarriers of the second layer corresponding to the multiplexed mixed coded RI.

18. The method of claim 1, wherein the slot comprises a first layer, a second layer, a third layer and a fourth layer, wherein a first codeword is mapped to the first layer and the second layer, wherein a second codeword is mapped to the third layer and the fourth layer, and wherein the method is performed on the first layer.

19. The method of claim 1, wherein the slot comprises a first layer, a second layer, a third layer and a fourth layer, wherein a first codeword is mapped to the first layer and the second layer, wherein a second codeword is mapped to the third layer and the fourth layer, wherein the mixed coded CQI/PMI is distributed and multiplexed on the first layer and the second layer, and wherein the mixed coded ACK/NACK and the mixed coded RI are distributed and mapped on the first layer, the second layer, the third layer and the fourth layer.

20. The method of claim 1, further comprising computing a number of symbols required for mixed control coding based on a scaled resource allocation offset.

21. A method for multiplexing uplink control information (UCI) on a physical uplink shared channel (PUSCH), comprising:
coding control data over a repeated portion of user data;
mapping the coded control data to a PUSCH resource;
mapping a data block base for the coded control data in the PUSCH resource; and
transmitting the control data and the user data on the PUSCH resource,
wherein the control data comprises channel quality indicators (CQI)/precoding matrix indicators (PMI), and further comprising:
multiplexing mixed coded CQI/PMI from the top down of a first layer of a slot, wherein the slot comprises the first layer and a second layer, wherein a first codeword is mapped to the first layer, and wherein a second codeword is mapped to the second layer;
using a first data block as a superposition coding base for the mixed coded CQI/PMI;
mapping a coded ACK/NACK on both the first codeword and the second codeword from the bottom up of the slot in a first plurality of required columns; and
mapping a coded RI on both the first codeword and the second codeword from the bottom up of the slot in a second plurality of required columns.

22. A method for multiplexing uplink control information (UCI) on a physical uplink shared channel (PUSCH), comprising:
coding control data over a repeated portion of user data;
mapping the coded control data to a PUSCH resource;
mapping a data block base for the coded control data in the PUSCH resource; and
transmitting the control data and the user data on the PUSCH resource,
wherein coding control data over a repeated portion of user data comprises:
removing symbols in the user data;
repeating symbols in the control data to increase a number of symbols in the control data;
copying a number of symbols in the user data that is the same as the number of symbols in the control data;
adding the copied user data symbols to the control data; and
multiplexing the user data and the control data.

23. The method of claim 22, wherein coding control data over a repeated portion of user data further comprises encoding the user data using a 1/3 Turbo code, low-density parity-check (LDPC) code, or a convolutional code.

24. The method of claim 22, wherein coding control data over a repeated portion of user data further comprises encoding the control data using a Reed-Muller code or a 1/3 tail biting convolutional code.

25. The method of claim 22, wherein the repeating comprises copying symbols in the control data k*m times, where k is a constant determined based on the type and size of the control data, a resource allocation offset sent from a base station, and a modulation and coding scheme (MCS), and m is a repetition scalar determined based on the resource allocation offset.

26. The method of claim 22, wherein the control data and user data are transmitted in a long term evolution (LTE) system.

27. The method of claim 22, wherein the adding comprises a bitwise exclusive or (XOR) operation.

28. The method of claim 22, wherein the control data is a channel quality indicator (CQI), acknowledgment/non-acknowledgment data (ACK/NACK), or a rank indicator (RI).

29. The method of claim 22, wherein the multiplexing comprises time division multiplexing (TDM) and channel multiplexing.

30. A wireless device for multiplexing uplink control information (UCI) on a physical uplink shared channel (PUSCH), comprising:
a processor;
memory in electronic communication with the processor; and
instructions stored in the memory, the instructions being executable by the processor to:
code control data over a repeated portion of user data;
map the coded control data to a PUSCH resource; and
map a data block base for the coded control data in the PUSCH resource,
wherein the PUSCH resource comprises a slot, wherein the control data comprises channel quality indicators (CQI)/precoding matrix indicators (PMI), acknowledgement/negative-acknowledgement (ACK/NACK) and rank indicators (RI), and wherein the instructions are further executable to:
multiplex mixed coded CQI/PMI from the top down of a slot;
use a first data block as a superposition coding base for the mixed coded CQI/PMI;
channel interleave mixed coded ACK/NACK from the bottom up in a first plurality of required columns of the slot;
use a second data block as a superposition coding base for the mixed coded ACK/NACK;
channel interleave mixed coded RI from the bottom up in a second plurality of required columns of the slot; and
use a third data block as a superposition coding base for the mixed coded RI.

31. The wireless device of claim 30, wherein the instructions are further executable to obtain a mixed CQI/PMI control output as an XOR output of the first data block and an expanded CQI/PMI control coding output.

32. The wireless device of claim 30, wherein the instructions are further executable to obtain a mixed ACK/NACK control output as an XOR output of the second data block and expanded ACK/NACK coding outputs.

33. The wireless device of claim 30, wherein the instructions are further executable to obtain a mixed RI control output as an XOR output of the third data block and expanded RI coding outputs.

34. The wireless device of claim 30, wherein a rate matched data output has a coding rate greater than 1/3, and wherein the first data block is on subcarriers that are immediately below a control multiplexing region as the superposition coding base.

35. The wireless device of claim 30, wherein a rate matched data output has a coding rate less than 1/3, and wherein the first data block is on subcarriers that are immediately below a turbo code repetition part.

36. The wireless device of claim 30, wherein the second data block is immediately above the channel interleaved mixed coded ACK/NACK, and wherein the third data block is immediately above the channel interleaved mixed coded RI.

37. The wireless device of claim 30, wherein the slot comprises a first layer and a second layer, wherein a codeword is mapped on both layers, and wherein the mapping is performed on the first layer.

38. The wireless device of claim 30, wherein the slot comprises a first layer and a second layer, wherein a codeword is mapped on both layers, wherein the UCI is distributed on the first layer and the second layer, and wherein the mapping is performed separately for each layer.

39. The wireless device of claim 30, wherein the slot comprises a first layer and a second layer, wherein a codeword is mapped on both layers, wherein the mixed coded CQI/PMI is multiplexed from the top down of the first layer of the slot; wherein the mixed coded RI is mapped from the bottom up in one of the plurality of required columns of the first layer, and wherein the mixed coded ACK/NACK is mapped from the bottom up in a first plurality of required columns of the second layer.

40. The wireless device of claim 39, wherein the first data block is on subcarriers that are immediately below the multiplexed mixed coded CQI/PMI, wherein the second data block is on subcarriers immediately above the channel interleaved mixed coded ACK/NACK, and wherein the third data block is immediately above the channel interleaved mixed coded RI.

41. The wireless device of claim 39, wherein the first data block is on subcarriers of the second layer corresponding to the multiplexed mixed coded CQI/PMI, wherein the second data block is on subcarriers of the second layer corresponding to the multiplexed mixed coded ACK/NACK, and wherein the third data block is on subcarriers of the second layer corresponding to the multiplexed mixed coded RI.

42. The wireless device of claim 30, wherein the slot comprises a first layer and a second layer, wherein a first codeword is mapped to the first layer, wherein a second codeword is mapped to the second layer, and wherein the mapping is performed on the first layer.

43. The wireless device of claim 30, wherein the slot comprises a first layer and a second layer, wherein a first codeword is mapped to the first layer, wherein a second codeword is mapped to the second layer, wherein the UCI is distributed on the first layer and the second layer, and wherein the mapping is performed separately for each layer.

44. The wireless device of claim 30, wherein the slot comprises a first layer and a second layer, wherein a first codeword is mapped to the first layer, wherein a second codeword is mapped to the second layer, wherein the mixed coded CQI/PMI is multiplexed from the top down of the first layer of the slot, wherein the mixed coded RI is mapped from the bottom up in one of the plurality of required columns of the first layer, and wherein the mixed coded ACK/NACK is mapped from the bottom up in a first plurality of required columns of the second layer.

45. The wireless device of claim 44, wherein the first data block is on subcarriers that are immediately below the multiplexed mixed coded CQI/PMI, wherein the second data block is on subcarriers immediately above the channel interleaved mixed coded ACK/NACK, and wherein the third data block is immediately above the channel interleaved mixed coded RI.

46. The wireless device of claim 44, wherein the first data block is on subcarriers of the second layer corresponding to the multiplexed mixed coded CQI/PMI, wherein the second data block is on subcarriers of the second layer corresponding to the multiplexed mixed coded ACK/NACK, and wherein the third data block is on subcarriers of the second layer corresponding to the multiplexed mixed coded RI.

47. The wireless device of claim 30, wherein the slot comprises a first layer, a second layer, a third layer and a fourth layer, wherein a first codeword is mapped to the first layer and the second layer, wherein a second codeword is mapped to the third layer and the fourth layer, and wherein the mapping is performed on the first layer.

48. The wireless device of claim 30, wherein the slot comprises a first layer, a second layer, a third layer and a fourth layer, wherein a first codeword is mapped to the first layer and the second layer, wherein a second codeword is mapped to the third layer and the fourth layer, wherein the mixed coded CQI/PMI is distributed and multiplexed on the first layer and the second layer, and wherein the mixed coded ACK/NACK and the mixed coded RI are distributed and mapped on the first layer, the second layer, the third layer and the fourth layer.

49. The wireless device of claim 30, wherein the instructions are further executable to compute a number of symbols required for mixed control coding based on a scaled resource allocation offset.

50. A wireless device for multiplexing uplink control information (UCI) on a physical uplink shared channel (PUSCH), comprising:
a processor;
memory in electronic communication with the processor; and
instructions stored in the memory, the instructions being executable by the processor to:
code control data over a repeated portion of user data;
map the coded control data to a PUSCH resource; and
map a data block base for the coded control data in the PUSCH resource,
wherein the control data comprises channel quality indicators (CQI)/precoding matrix indicators (PMI), and wherein the instructions are further executable to:
multiplex mixed coded CQI/PMI from the top down of a first layer of a slot, wherein the slot comprises the first layer and a second layer, wherein a first codeword is mapped to the first layer, and wherein a second codeword is mapped to the second layer;
use a first data block as a superposition coding base for the mixed coded CQI/PMI;
map a coded ACK/NACK on both the first codeword and the second codeword from the bottom up of the slot in a first plurality of required columns; and map a coded RI on both the first codeword and the second codeword from the bottom up of the slot in a second plurality of required columns.

51. A wireless device for multiplexing uplink control information (UCI) on a physical uplink shared channel (PUSCH), comprising:
 a processor;
 memory in electronic communication with the processor; and
 instructions stored in the memory, the instructions being executable by the processor to:
  code control data over a repeated portion of user data;
  map the coded control data to a PUSCH resource; and
  map a data block base for the coded control data in the PUSCH resource,
 wherein coding control data with user data repetition comprises:
  removing symbols in the user data;
  repeating symbols in the control data to increase a number of symbols in the control data;
  copying a number of symbols in the user data that is the same as the number of symbols in the control data;
  adding the copied user data symbols to the control data; and
  multiplexing the user data and the control data.

52. The wireless device of claim 51, wherein coding control data over a repeated portion of user data further comprises encoding the user data using a 1/3 Turbo code, low-density parity-check (LDPC) code, or a convolutional code.

53. The wireless device of claim 51, wherein coding control data over a repeated portion of user data further comprises encoding the control data using a Reed-Muller code or a 1/3 tail biting convolutional code.

54. The wireless device of claim 51, wherein the repeating comprises copying symbols in the control data k*m times, where k is a constant determined based on the type and size of the control data, a resource allocation offset sent from a base station, and a modulation and coding scheme (MCS), and m is a repetition scalar determined based on the resource allocation offset.

55. The wireless device of claim 51, wherein the control data and user data are transmitted on a physical uplink shared channel (PUSCH) in a long term evolution (LTE) system.

56. The wireless device of claim 51, wherein the adding comprises a bitwise exclusive or (XOR) operation.

57. The wireless device of claim 51, wherein the control data is a channel quality indicator (CQI), acknowledgment/non-acknowledgment data (ACK/NACK), or a rank indicator (RI).

58. The wireless device of claim 51, wherein the multiplexing comprises time division multiplexing (TDM) and channel multiplexing.

* * * * *